United States Patent [19]

Kishi

[11] Patent Number: 5,232,232
[45] Date of Patent: Aug. 3, 1993

[54] MECHANISM FOR MOVING A HEAVY OBJECT

[75] Inventor: Mitsuhiro Kishi, Ashikaga, Japan

[73] Assignee: Japanic Corporation, Asikaga, Japan

[21] Appl. No.: 728,133

[22] Filed: Jul. 10, 1991

[30] Foreign Application Priority Data

Jul. 19, 1990 [JP] Japan ............................... 2-191420
Aug. 29, 1990 [JP] Japan ............................... 2-227243

[51] Int. Cl.$^5$ .............................................. B62B 1/12
[52] U.S. Cl. .................................. 280/43.1; 280/641; 280/43.17; 280/47.24
[58] Field of Search ................. 280/43.1, 43.12, 43.14, 280/43.17, 43.19, 43.22, 43.24, 47.315, 641, 38, 39, 40, 79.11, 652, 79.2, 655, 655.1, 47.17, 47.18, 47.21, 47.22, 47.24, 47.26, 47.31; 248/646, 647, 127

[56] References Cited

U.S. PATENT DOCUMENTS

| | | | |
|---|---|---|---|
| 1,633,473 | 6/1927 | Bush | 280/43.22 |
| 1,921,420 | 8/1933 | Macoure | 280/43.1 |
| 2,878,029 | 3/1959 | Dahm et al. | 280/43.1 |
| 4,846,493 | 7/1989 | Mason | 280/43.1 |

Primary Examiner—Richard M. Camby
Attorney, Agent, or Firm—Flynn, Thiel, Boutell & Tanis

[57] ABSTRACT

A heavy object, such as a portable toilet, is supported on a base. At least one wheel is mounted on the base for vertical movement between an upper position in which the wheel is supported above the lower surface of the base and a lower position in which at least a portion of the periphery of the wheel is below the lower surface of the base. The wheel is releasably held in one or the other of those positions. A handle is movably mounted on the object so that the object can be manually swung to permit the wheel to move between those positions.

15 Claims, 23 Drawing Sheets

MECHANISM FOR MOVING A HEAVY OBJECT

BACKGROUND OF THE INVENTION

1. Field of the Invention:

The present invention relates to a mechanism for moving a heavy object comprising a base on which the object is supported, said base having at least one wheel so that the heavy object and the base can be moved easily and means for storing the wheel(s) inside the base.

2. Description of the Prior Art:

There are many instances in which heavy objects, such as portable toilets, generators, compressors, prefabricated houses, containers, oil tanks, etc. need to be moved a short distance. These heavy objects are not permanently fixed to the ground by an anchor or by being incorporated in a building, but rather, they are temporarily fixed at locations where such heavy objects are used because they will need to be moved to the next positions where they will be used. It is difficult to raise and move these heavy objects because they are not light, unlike tools and implements. Accordingly, the heavy objects are typically lifted by the cable of a crane or by the fork of a forklift truck. The heavy objects can be smoothly transported by the crane or the forklift truck, thereby facilitating the working efficiency without heavily burdening the operator.

When these objects are to be carried for long distances, the crane and the forklift truck are very effective. However, if these heavy objects are to be moved a relatively short distance, e.g. several tens of meters, cranes and forklift trucks are seldom used because they are complex and costly. Furthermore, it is difficult to use cranes and forklift trucks for moving these heavy objects a very short distance of several tens of centimeters after these heavy objects have been transferred to the location where they are installed.

There has been a demand for apparatus for moving heavy objects which are difficult to move by manpower, yet which need to be moved only a short distance. That is, there is a demand for an apparatus by means of which a heavy object can be easily moved by a simple apparatus and without using a crane or a forklift truck and without heavily burdening the operator, thereby facilitating the working efficiency.

SUMMARY OF THE INVENTION

It is, therefore, an object of the present invention to provide a mechanism for moving a heavy object, which mechanism has a simple structure and is capable of moving the object easily.

To achieve the object, the mechanism for moving the heavy object, according to the first aspect of the present invention, comprises a base on which the heavy object is placed, at least one wheel provided on the base and capable of vertically swinging with respect to the base between a retracted position inside the base and a projected position in which it projects below the base, an engaging means engageable with the wheel and effective for keeping the wheel in the projected position in which it projects below the lower surface of the base and a folding handle capable of being folded at the opposite lateral sides of the base.

The mechanism for moving the heavy object, according to a second aspect of the present invention, comprises a base having a heavy object placed thereon, at least one wheel provided on the base and capable of vertically swinging with respect to the base between a retracted position inside the base and a projected position in which it projects below the base, a fixing means interposed between the base and the wheel and effective for temporarily keeping the wheel in the projected position in which position the wheel is disposed below the lower surface of the base and a folding handle capable of being folded at the opposite lateral sides of the base.

DESCRIPTION OF THE PREFERRED EMBODIMENTS

Figure 1:
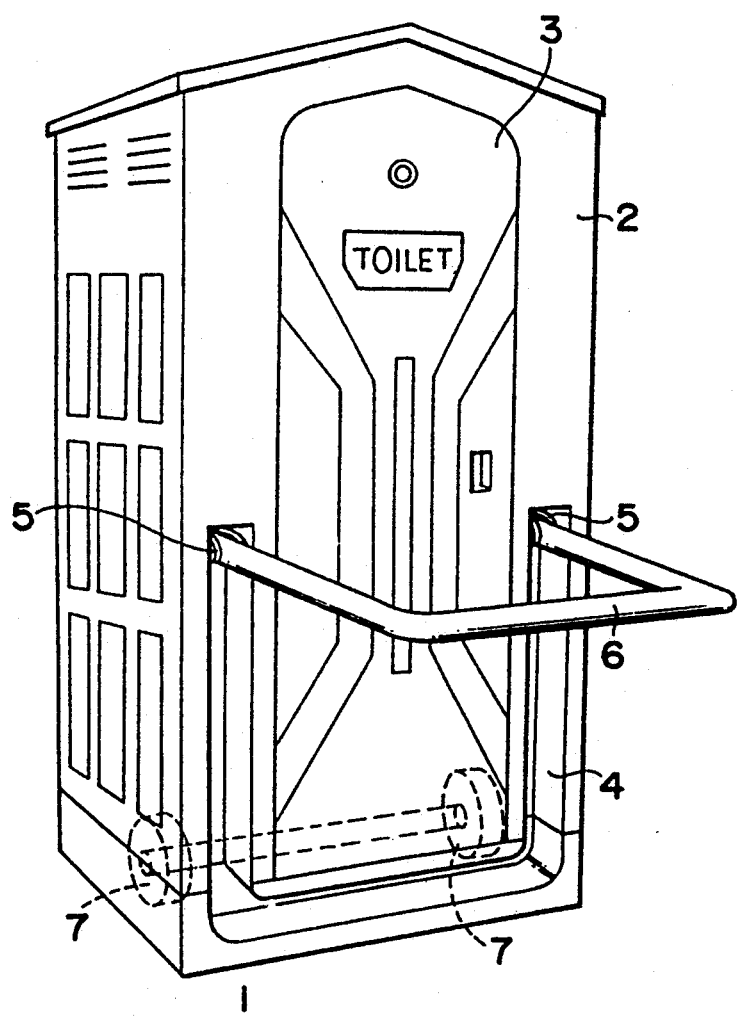
FIG. 1 is a perspective view showing a moving mechanism for a portable toilet, as an example of a heavy object, according to a first embodiment of the present invention.
Figure 2A:
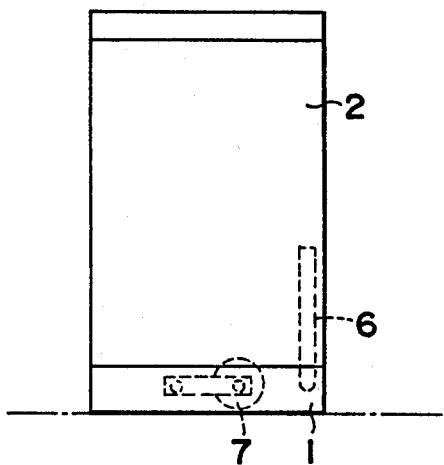
FIGS. 2(A), 2(B), 2(C) and 2(D) are schematic views for explaining an operation of the moving mechanism in FIG. 1.
Figure 2B:
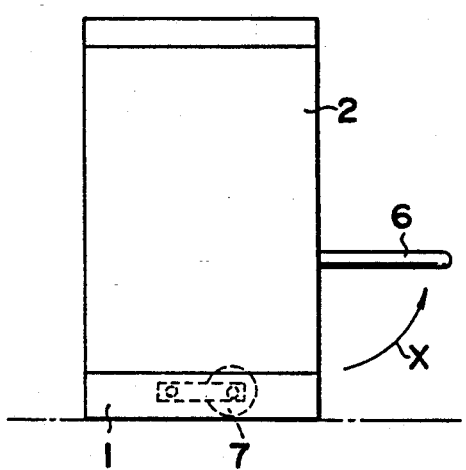
Figure 2C:
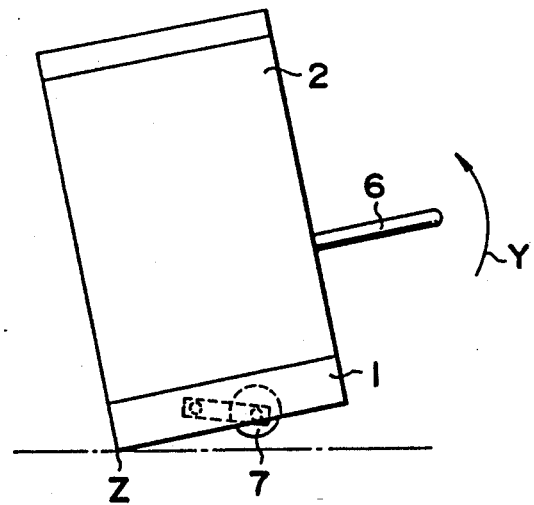
Figure 2D:
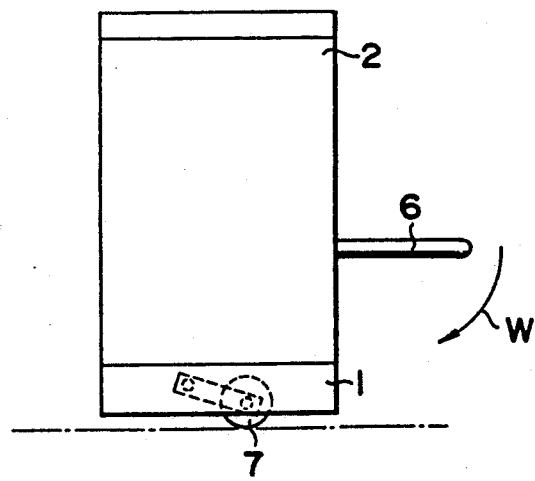
Figure 3:
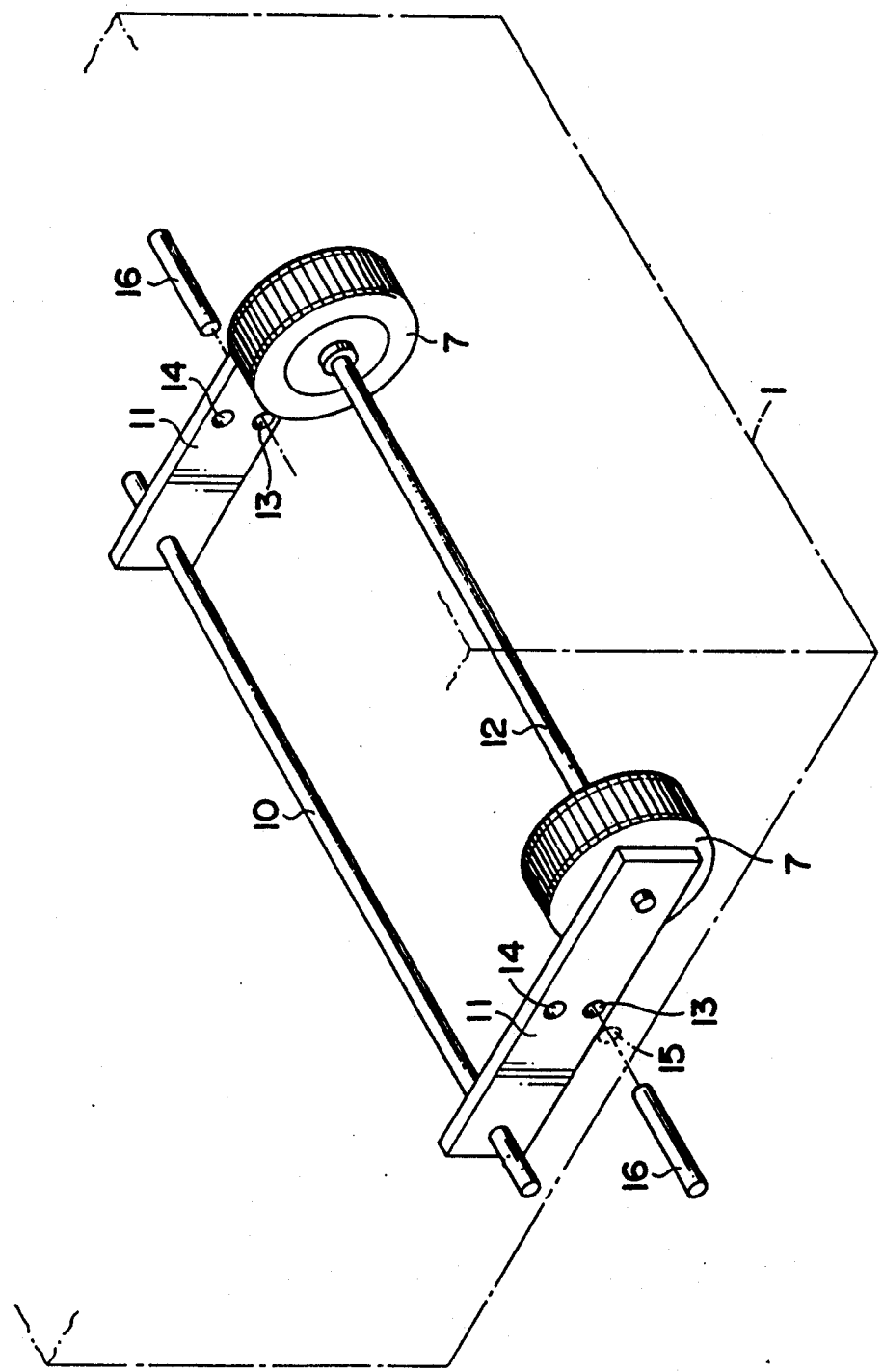
FIG. 3 is a perspective view showing a part of the moving mechanism in FIG. 1.

First Embodiment (FIGS. 1 to 3)

A moving mechanism for a heavy object, according to a first embodiment of the present invention, will be described with reference to FIGS. 1 to 3 in which a portable toilet is employed as a representative example of a heavy object.

The portable toilet 2, having substantially the shape of an outhouse, is fixedly mounted on a substantially flat base 1. The base 1 and the toilet 2 are integrated with each other. They are generally rectangular in top plan view and they are substantially of the same external dimensions. The interior of the base 1 is hollow and the exterior thereof has the same shape as the perimeter of the toilet 2 so that the base, in effect, constitutes a downward extension of the toilet. Accordingly, the base 1 and the toilet 2 are assembled as a single structure when viewed from the outside.

The portable toilet 2 has a large door 3 in the central portion of the front wall thereof, through which door a person can enter the toilet. A groove or cavity 4 includes lateral leg portions provided in the front wall of the toilet 2 on opposite sides of the door and a horizontal connecting portion in the front wall of the base 1 below the lower edge of the door. The housing groove 4 is substantially U-shaped when viewed from the front and it borders approximately the lower half of the door 3. Handle mountings 5 are fixed in upper ends of the leg portions of the housing groove 4. A U-shaped handle 6 is pivotally supported by the handle mountings 5. The handle 6 has a shape and size substantially the same as those of the housing groove 4. The handle 6 can be entirely received in the housing groove 4 when the handle is pivoted downwardly about the axis of the handle mountings 5. Wheels 7 are positioned in the interior hollow space of the base 1 close to the right and left sides thereof and said wheels are swingable vertically, as described later, between (1) an upper position in which they are received inside the base and above the lower surface thereof and (2) a lower position in which at least a portion of the periphery of the wheels extends below the lower surface of the base. The wheels 7 can be releasably fixed in the upper and lower positions, as will be described hereinbelow.

A method for moving the heavy object, i.e., the portable toilet 2, will be described with reference to FIGS. 2(A) through 2(D).

FIG. 2(A) shows the state wherein the portable toilet 2 is installed on the ground with the lower surface of the base 1 resting on the ground. The toilet 2 may be ready for use or it may be stored, in this state, when it is not in use.

The toilet 2 can be moved to a new location spaced from the original position a distance of several meters in the condition as illustrated in FIG. 2(A). When toilet 2 is to be moved to a new site which is close to the original position, the handle 6 is first withdrawn from the housing groove 4 and is raised upwardly as indicated by the arrow X in FIG. 2(A). The handle 6 is raised to a position in which it extends at a right angle relative to the front wall of the toilet 2. The handle 6 is not further pivotable upwardly on the mountings 5, but rather, it is maintained in a position in which it extends substantially at a right angle relative to the toilet 2 when the handle 6 is raised farther.

Inasmuch as the handle 6 and the toilet 2 are fixed in the state wherein they extend at a right angle to each other, a further force applied for raising the handle 6, as indicated by the arrow Y in FIG. 2(C), is effective to raise the front edge of the toilet 2 relative to the rear edge thereof so that the toilet, as a whole, is inclined upwardly about the rear end edge Z of the base 1. In this condition, the wheels 7 housed inside the base 1 are free to pivot downwardly therebelow, by gravity, to a limited extent.

Thereafter, when the handle 6 is lowered in the direction of the arrow W in FIG. 2(D), while the wheels 7 are suspended below base 1, the lower surfaces of the wheels 7 contact the ground so that the base 1 is rollably supported by the wheels 7. The wheels 7 are rollable along the ground by pushing or pulling the handle 6. Thereby the base 1 and the toilet 2 are movable freely with relatively light force.

Inasmuch as the base 1 and the toilet 2 can be supported by the wheels 7 and rolled about, the heavy object, such as the toilet 2, can be moved easily by manpower. If the toilet 2 is moved to a first position wherein it is used while it is still supported by the wheels and thereafter is moved to another position where the portable toilet 2 is then to be fixed, the procedure of operation is reversed relative to that set forth above, i.e. The procedure is in the order of the states as illustrated in FIGS. 2(D), (C), (B) and (A).

The following description relates to the vertical swinging motion of the wheels 7 inside the base 1 and the mechanism for fixing the wheels.

FIG. 3 shows a mechanism for fixing the wheels 7.

A long supporting shaft 10 extends between and is supported by the right and left sidewalls of the base 1. A pair of elongated holding plates 11 are positioned inside the hollow central portion of the base 1 and they are located close to and extend substantially parallel to the right and left sidewalls of the base. The plates 11 are supported for vertical swinging movement, relative to the base 1, on the shaft 10. The opposite ends of a wheel-supporting shaft 12 are supported by the holding plates 11 so that the shaft 12 can move upwardly and downwardly with the plates 11. A pair of wheels 7 are rotatably supported on the shaft 12 close to the opposite ends thereof. Connection holes 13 and 14 are provided in the holding plates 11 approximately midway between shafts 10 and 12 and close to the upper and lower edges of said plates, respectively. Both sidewalls of the base 1 have insertion holes 15 at positions which are selectively alignable with either the connection holes 13 or the connection holes 14, at one time. Lock pins 16 are slidably insertable into the insertion holes 15 and into either the holes 13 or the holes 14 when same are aligned with holes 15. When the base 1 is positioned as shown in FIGS. 2(A) and 2(B), the holding plates 11 are in the raised position wherein the lock pins 16 are inserted into the insertion holes 15 and the lower connection holes 13, whereby the wheels 7 do not extend below the lower edge of the base 1. However, when the lock pins 16 are removed from the connection holes 13 and the moving mechanism is moved from the state as illustrated in FIG. 2(B) to the state as illustrated in FIG. 2(C), both the holding plates 11 will pivot downwardly about the axis of the supporting shaft 10 when the base 1 is raised so that the wheels 7 can hang downwardly and project below the lower edge of the base 1 When the wheels 7 extend below the lower surface of the base 1 so that holes 14 and 15 are aligned, the lock pins 16 can be inserted into the insertion holes 15 and the connection holes 14, thereby fixing the holding plates 11 in a downwardly and forwardly inclined position relative to the base 1. In this condition, wherein at least a portion of the periphery of the wheels 7 extends below the lower surface of the base 1, the base 1 and the portable toilet 2 can be rolled about, in the position as illustrated in FIG. 2(D).

Although the structure, according to the first embodiment, is very simple, it requires two operators, namely, one operator to operate the handle 6 and another operator to insert the pins 16 into or remove the pins 16 from the insertion holes 15 and the connection holes 13 and 14. This is not completely satisfactory from the viewpoint of efficent use of manpower.

Figure 4:
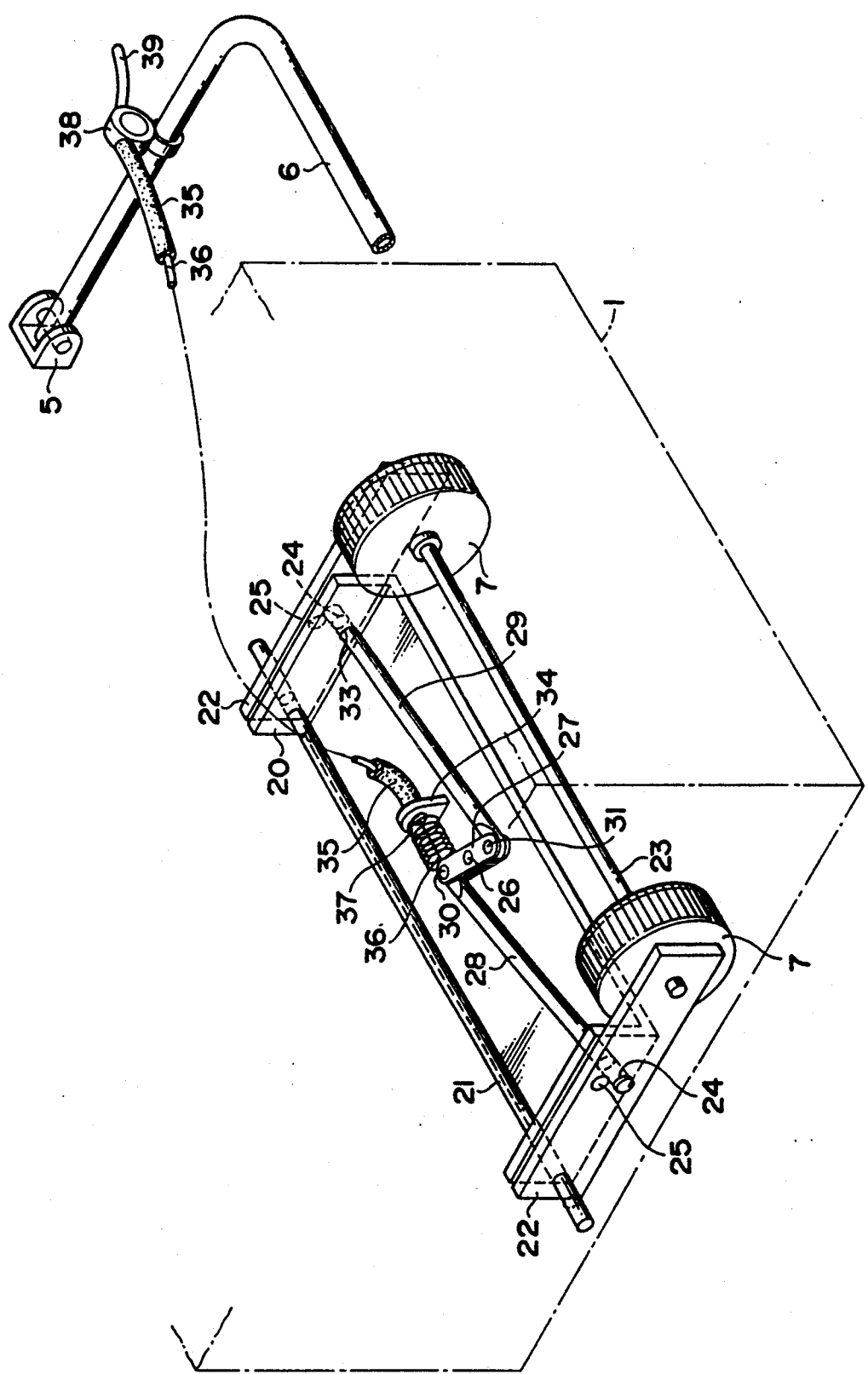
FIG. 4 is a perspective view showing a part of a moving mechanism according to a second embodiment of the present invention.
Figure 5:
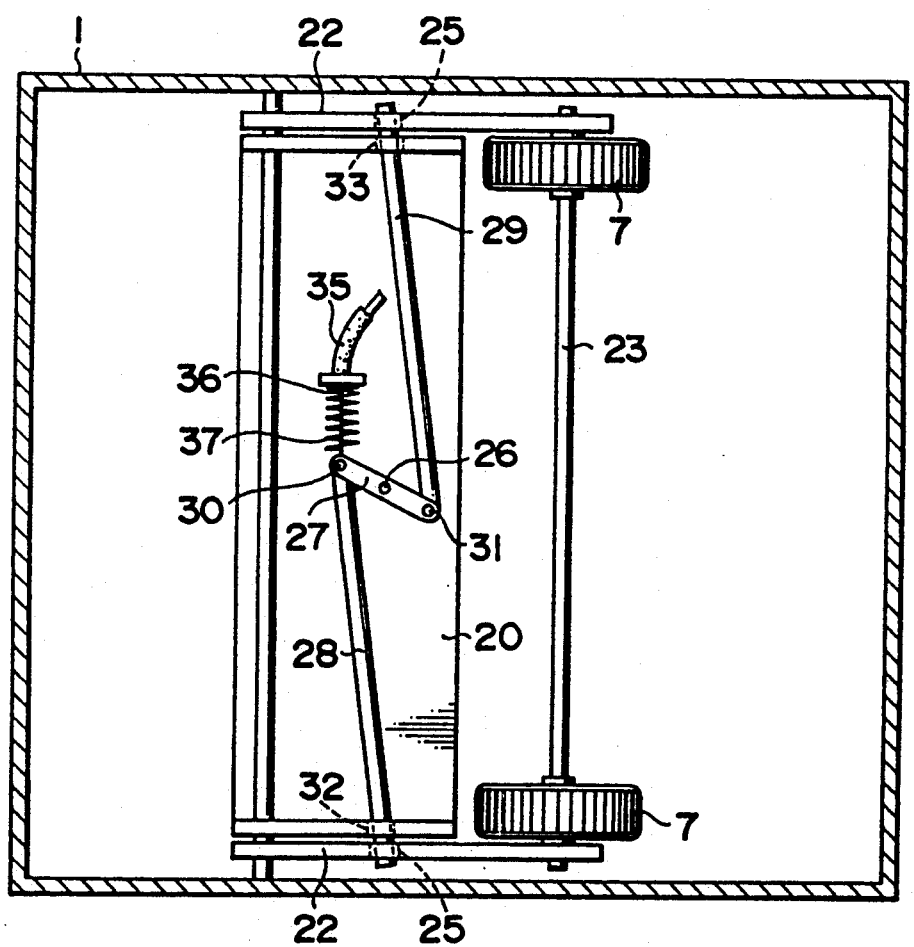
FIG. 5 is a plan view of the moving mechanism in FIG. 4.

Second Embodiment (FIGS. 4 and 5)

A moving mechanism for a heavy object, according to a second embodiment, will be described with reference to FIGS. 4 and 5.

According to the arrangement of the second embodiment, one operator can operate the handle 6 and, also, can fix and release the wheels 7 without assistance.

A holding frame 20 is fixed to the base 1 at the inner central portion of the base 1 and it extends between the sidewalls of said base. The frame 20 has upwardly extending wall portions at both lateral ends thereof. The right and left upwardly extending wall portions of the holding frame 20 are spaced from the inner surfaces of the right and left sidewalls of the base 1. The holding frame 20 has a supporting shaft 21 at the rear end thereof which shaft extends through the upwardly extending wall portions at the ends of the frame 20 near the rear thereof. The supporting shaft 21 extends through the swing plates 22 which are positioned in the spaces between the right and left upwardly extending walls of the holding frame 20 and the sidewalls of the base 1. The swing plates 22 correspond to the plates 11 in the first embodiment. The swing plates 22 can be pivoted vertically, relative to the base 1 and the frame 20, about the axis of shaft 21. The swing plates 22 are longer than the width of the holding frame 20. A wheel shaft 23 extends transversely between said swing plates at a location in front of the frame 20. The wheel shaft 23 has wheels 7 mounted thereon at opposite ends thereof. The swing plates 22 have upper and lower connection holes 24 and 25 at the central portions thereof, which holes 24 and 25 penetrate through the swing plates 22.

A shaft 26 extends upwardly from the upper surface of the holding frame 20. A lever 27 is pivotally mounted on the shaft 26. Rods 28 and 29 are pivotally connected to opposite ends of the lever 27 by pins 30 and 31, for providing a linkage. The rods 28 and 29 are respectively extended through insertion holes 32 and 33 provided in the right and left side upwardly extending sidewalls of the holding frame 20. The rods 28 and 29 are selectively extendable into either the holes 24 or the holes 25 in the swing plates 22 in order to releasably lock the swing plates in a raised or lowered position. A spring seat 34 extends upwardly from the holding frame 20 at a position close to the pin 30 and on the central portion of the upper surface of the holding frame 20. A wire cable 35 has a cable housing whose tip end contacts the spring seat 34 and said wire cable has a wire 36 inside the cable housing, which is connected to the inner end of the rod 28. A coil spring 37 is interposed between the spring seat 34 and the lever 27 and the wire 36 extends through the coil spring. The lever 27 is always biased by the coil spring 37 counterclockwise as appearing in FIGS. 4 and 5.

The wire cable 35 extends upwardly from the base 1 to the handle 6 and the cable 35 is secured to a lever receiver 38 which in turn is mounted on the handle 6. A lever 39, adapted to be operated by the operator, protrudes from the lever receiver 38 and is coupled to the wire 36. When the operator operates the lever 39 to pull or release the wire 36 in the wire cable 35, the lever 27 is turned about the axis of shaft 26.

The wheels 7 are disposed inside the base 1 in FIG. 4. If the rods 28 and 29 protrude from the insertion holes 32 and 33 and both the rods 28 and 29 are inserted into the lower connection holes 24, the swing plates 22 are locked in place in a raised position and the wheels 7 are entirely received inside the base 1. If the lever 39 is pulled in order to pull the wire 36 against the resilient force of the spring 37 at the time when the base 1 is inclined by the handle 6 as illustrated in FIG. 2(B), both the rods 28 and 29 are withdrawn from the connection holes 24. As a result, the swing plates 22 swing downwardly about the axis of the supporting shaft 21 so that the wheels 7 are lowered together with the swing plates 22. When the lever 39 is released, while the swing plates 22 are swung downwardly about the supporting shaft 21 and the wheels 7 are lowered (FIG. 2(C)), the wire 36 is returned by the resilience of the spring 37. At the same time, the arm 27 is turned counterclockwise about the shaft 26 and the tip ends of the rods 28 and 29 are respectively inserted into the upper connection holes 25 so that the swing plates 22 are fixed to the holding frame 20 in the condition wherein the swing plates 22 are inclined downwardly relative to the holding frame 20. Accordingly, since the wheels 7 are disposed under the lower surface of the base 1 as illustrated in FIG. 2(C), the wheels 7 contact the ground whereby the portable toilet 2 can be moved by the operation of the wheels 7.

Figure 6:
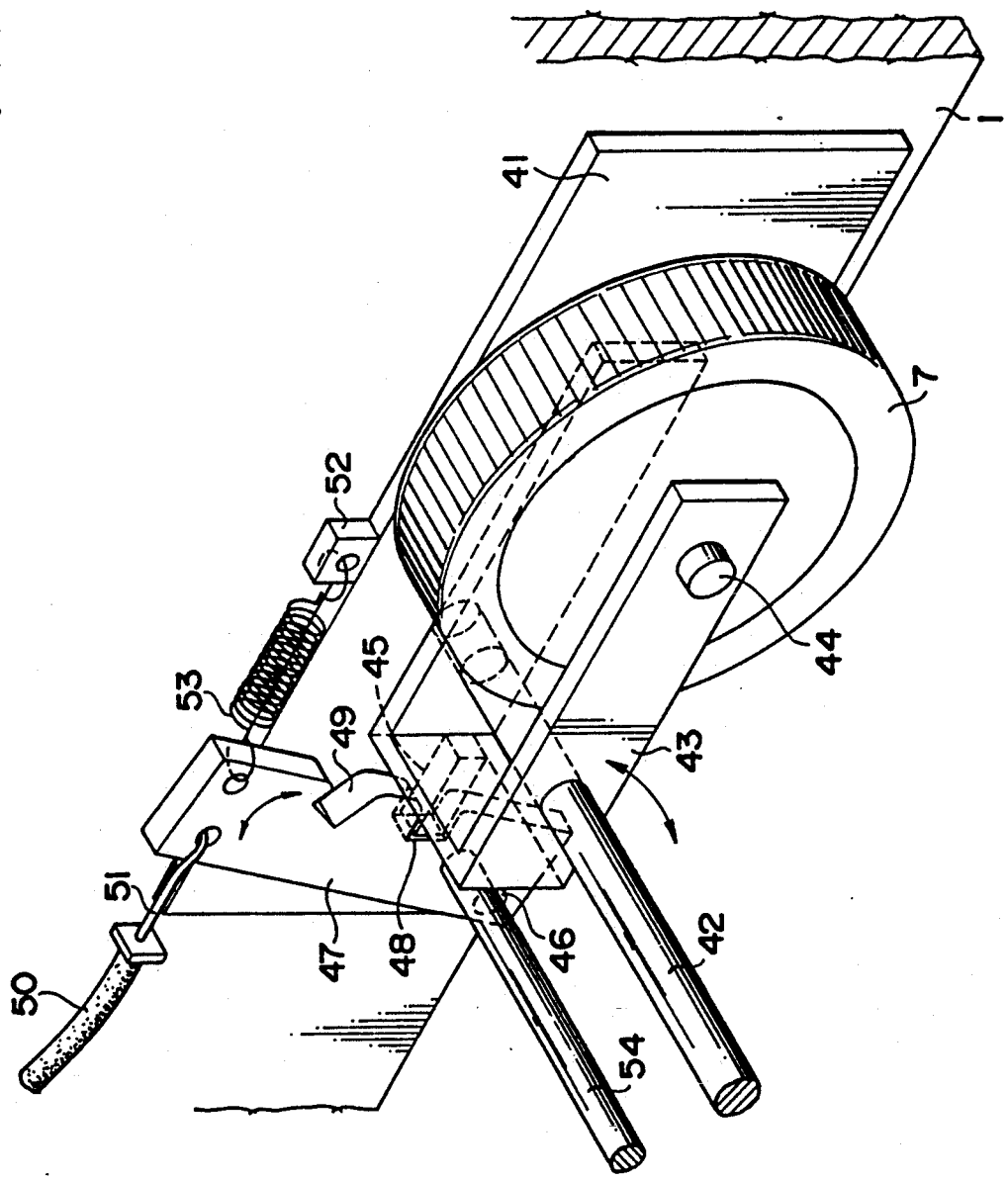
FIG. 6 is an enlarged perspective view showing a part of a moving mechanism according to a third embodiment of the present invention.
Figure 7:
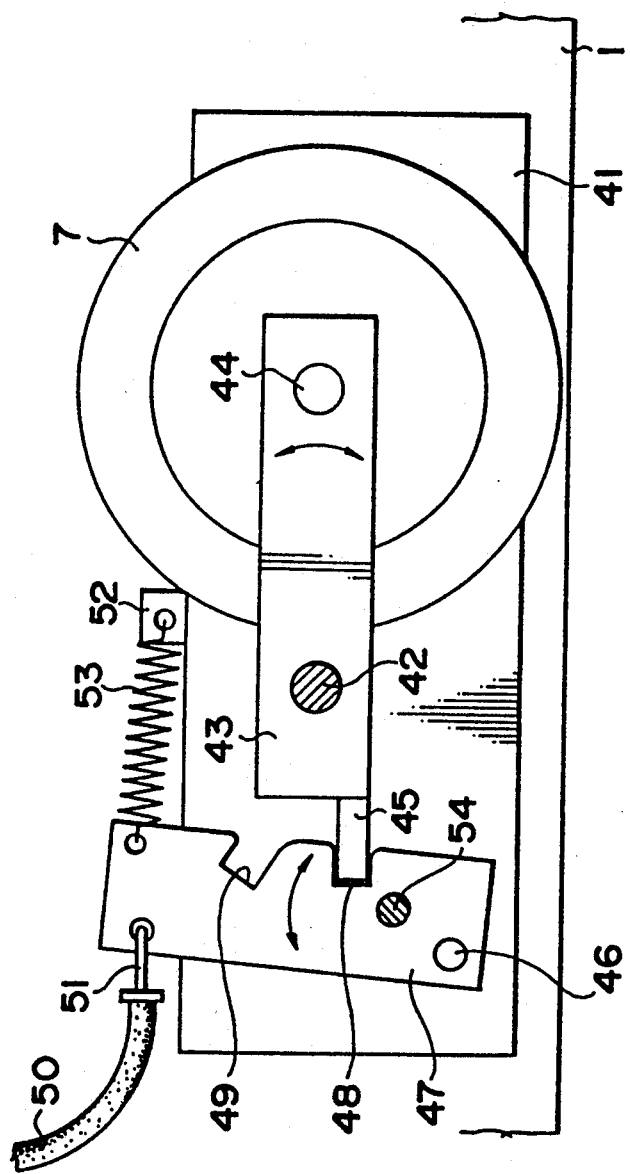
FIGS. 7 and 8 are views showing operations of the moving mechanism in FIG. 6.
Figure 8:
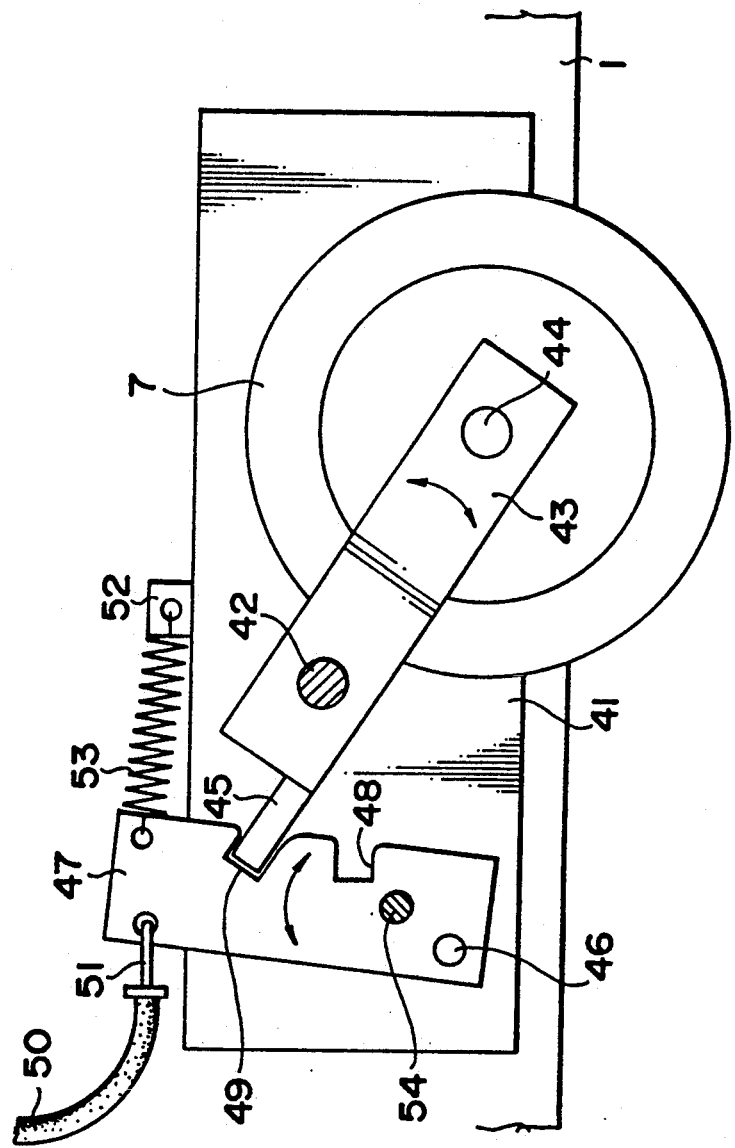

Third Embodiment (FIGS. 6 to 8)

A moving mechanism for a heavy object according to a third embodiment will be described with reference to FIGS. 6 to 8.

The third embodiment exemplifies a support mechanism for holding one of the wheels 7. The support mechanism for holding the other wheel 7 has the same arrangement and, accordingly, illustration thereof is believed to be unnecessary.

A shaft-supporting plate 41 is fixed to the inner surfaces of the sidewalls of the base 1. A supporting shaft 42 extends between the shaft-supporting plates 41 on opposite sides of the base 1. A substantially U-shaped swing body 43 is vertically swingably mounted on the supporting shaft 42. The swing body 43 provides an opening in which the wheel 7 is inserted. The wheel 7 is rotatably supported by a wheel shaft 44 which extends through and between the legs of the swing body 43 at a location close to the free end thereof. A rectangular lug 45 protrudes rearwardly from the rear end of the swing body 43.

A locking plate 47 is pivotally supported by a shaft 46 which shaft is located close to the rear lower corner of the shaft-supporting plate 41. The locking plate 47 can swing in a direction parallel to the shaft-supporting plate 41 and it has a pair of vertically spaced-apart engaging notches 48 and 49 in the upright front edge thereof. A cable 51, which is slidable in the wire cable housing 50, is connected to the upper end of the locking plate 47 close to the upward rearward corner thereof. The wire cable housing 50 and cable 51 extend to a lever body which can be the same as the lever body 38 as illustrated in FIG. 4. A spring hook 52 protrudes from the upper edge of the shaft-supporting plate 41 near the center thereof. A coil spring 53 is connected between the spring hook 52 and the upper end of the locking plate 47. The locking plate 47 is always biased toward the wheel 7 by the coil spring 53. An interlocking rod 54 is attached to the locking plate 47 above the shaft 46 and its other end is connected to the other locking plate for supporting the other wheel 7. Both the locking plates 47 are swingable about the axis of their shafts 46 at the same time.

The operation of the moving mechanism according to the third embodiment will be described with reference to FIGS. 7 and 8. When the wheel 7 is raised and the base 1 is resting on the ground as illustrated in FIG. 2(A), the lug 45 is received in the engaging notch 48 provided toward the lower side of the locking plate 47 so that the swing body 43 is kept parallel with the ground and the wheel 7 is not lowered.

When the wheel 7 is to be lowered as illustrated in FIG. 2(C), the locking plate 47 is turned counterclockwise by pulling the wire 51 so that the engaging notch 48 is disengaged from the lug 45. Since the lug 45 is removed from the locking body 47, the wheel 7 together with the swing body 43 swings downwardly about the axis of supporting shaft 42, owing to gravity, when the base 1 is inclined as illustrated in FIG. 2(C). As a result, the swing body 43 is inclined downwardly relative to the shaft-supporting plate 41. Thereafter, when the wire 51 is slackened, the locking plate 47 is returned (pivoted clockwise) by the coil spring 53 so that the lug 45 meshes with the engaging notch 49 whereby the locking plate 47 is retained in the position as illustrated in FIG. 8. Accordingly, the lower portion of the periphery of the wheel 7 extends below the lower surface of the base 1 and is releasably locked in that position as illustrated in FIG. 2(D). In that state, since the wheel 7 extends under the lower surface of the base 1, the base 1 and the toilet 2 can be readily moved.

When the wheel 7 is to be received in its upper position inside the base 1, the wire 51 is pulled so that the body 47 is pivoted counterclockwise, the engaging groove 49 is disengaged from the lug 45, the swing body 43 and wheel 7 pivot upwardly into the base and then the wire 51 is slackened and the lug 45 meshes the engaging slot 48.

Figure 9:
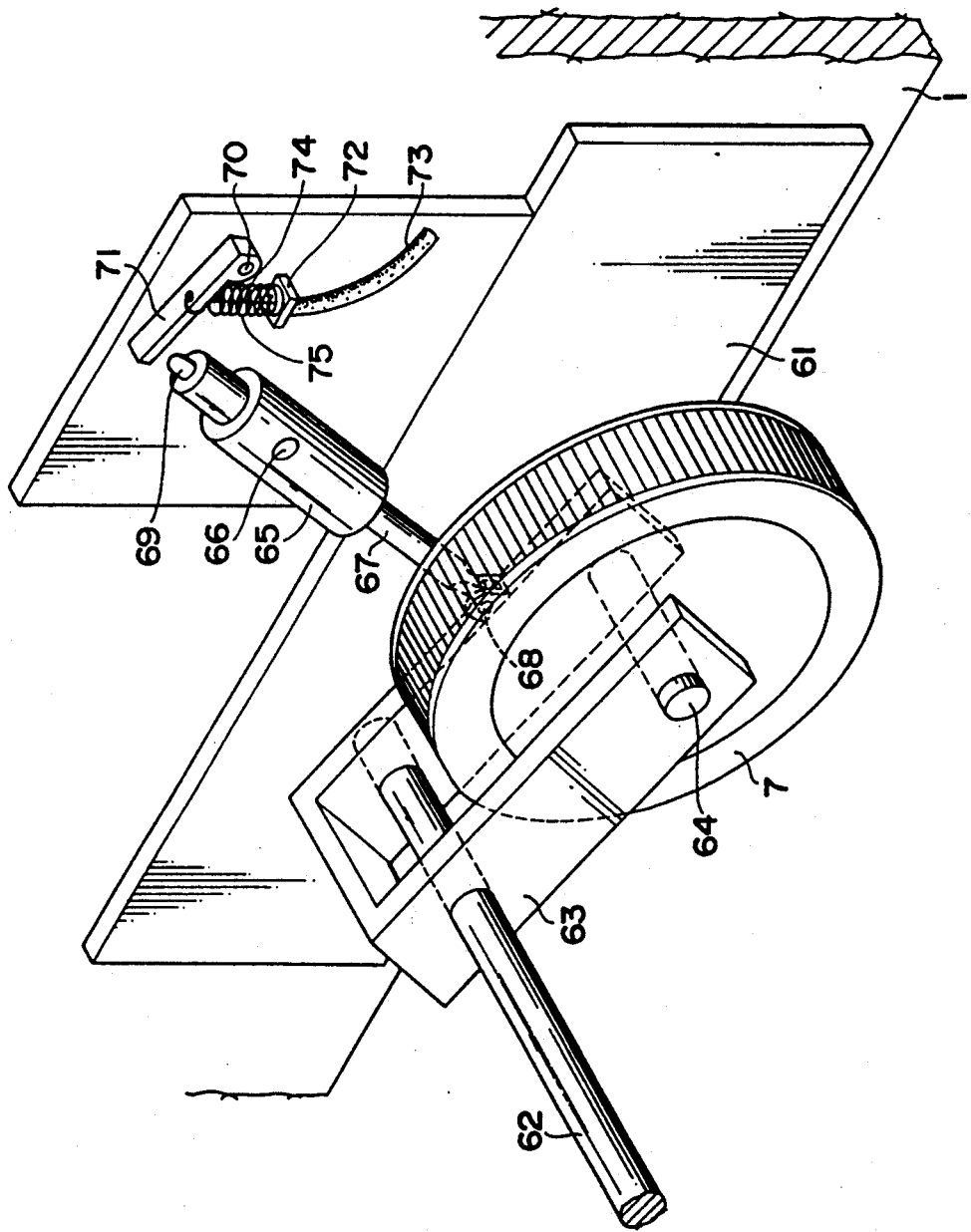
FIG. 9 is an enlarged perspective view showing a part of a moving mechanism according to a fourth embodiment of the present invention.

Fourth Embodiment (FIG. 9)

A mechanism for moving a heavy object according to a fourth embodiment will be described with reference to FIG. 9 in which there is provided a pneumatic cylinder for releasably fixing the wheel 7. A supporting rod 62 extends between right and left shaft-supporting plates 61 which are fixed to the inside surface of the base 1. Only one of the wheels 7 and supporting plates 61 is shown in FIG. 9. The other wheel and supporting plate have the same construction. A substantially U-shaped swing body 63 is rotatably supported on the rod 62. A wheel 7 is positioned between the legs of the swing body 63 and is rotatably supported thereon by a shaft 64 which is mounted on the swing body 63. The base of a pneumatic cylinder 65 is pivotally supported on the upper end of the shaft-supporting plate 61 by a pivot 66. The tip end of the rod 67 of the pneumatic cylinder 65 is pivotally connected to the swing body 63 by a pin 68.

The pneumatic cylinder 65 can be selectively operated to permit rod 67 to slide or to fix the same against movement by controlling the flow of air into the inside thereof. The cylinder has an air valve 69 protruding from the upper end thereof for controlling the flow of air. An operation plate 71 is pivotally supported by the pin 70 and has a tip end capable of contacting an actuator of the air valve 69. A receiver 72 is fixed to the shaft-supporting plate 61 at a location close to the operation plate 71. A wire cable housing 73 bears against the plate 71. A wire 74 extends from the wire cable housing 73 and is connected to the operation plate 71. A coil spring 75 is interposed between the operation plate 71 and the wire receiver 72 and surrounds the wire 74. The operation plate 71 is always biased upwardly by the coil spring 75. When the wheel 7 is to be swung vertically and is to be fixed, as described in the fourth embodiment, the wire 74 inside the wire cable housing 73 is pulled or slackened. That is, when the wire 74 is pulled, the operation plate 71 pivots downwardly about the axis of pin 70 to thereby push the air valve 69. Then, the piston inside the pneumatic cylinder 65 can slide freely so that the cylinder rod 67 can be freely moved to permit pivoting of the swing body 63 and wheel 7. If the wire 74 is slackened when the wheel 7 is below the lower surface of the base 1 (as illustrated in FIG. 2(C)), the operation plate 71 is returned by the coil spring 75 so that the air valve 69 is closed. As a result, the swing body 63 is not returned upwardly because the pneumatic cylinder 65 is fixed in the condition wherein it pushes the rod 67 whereby the wheel 7 can be retained in the state in which it projects below the lower surface of the base 1.

Figure 10:
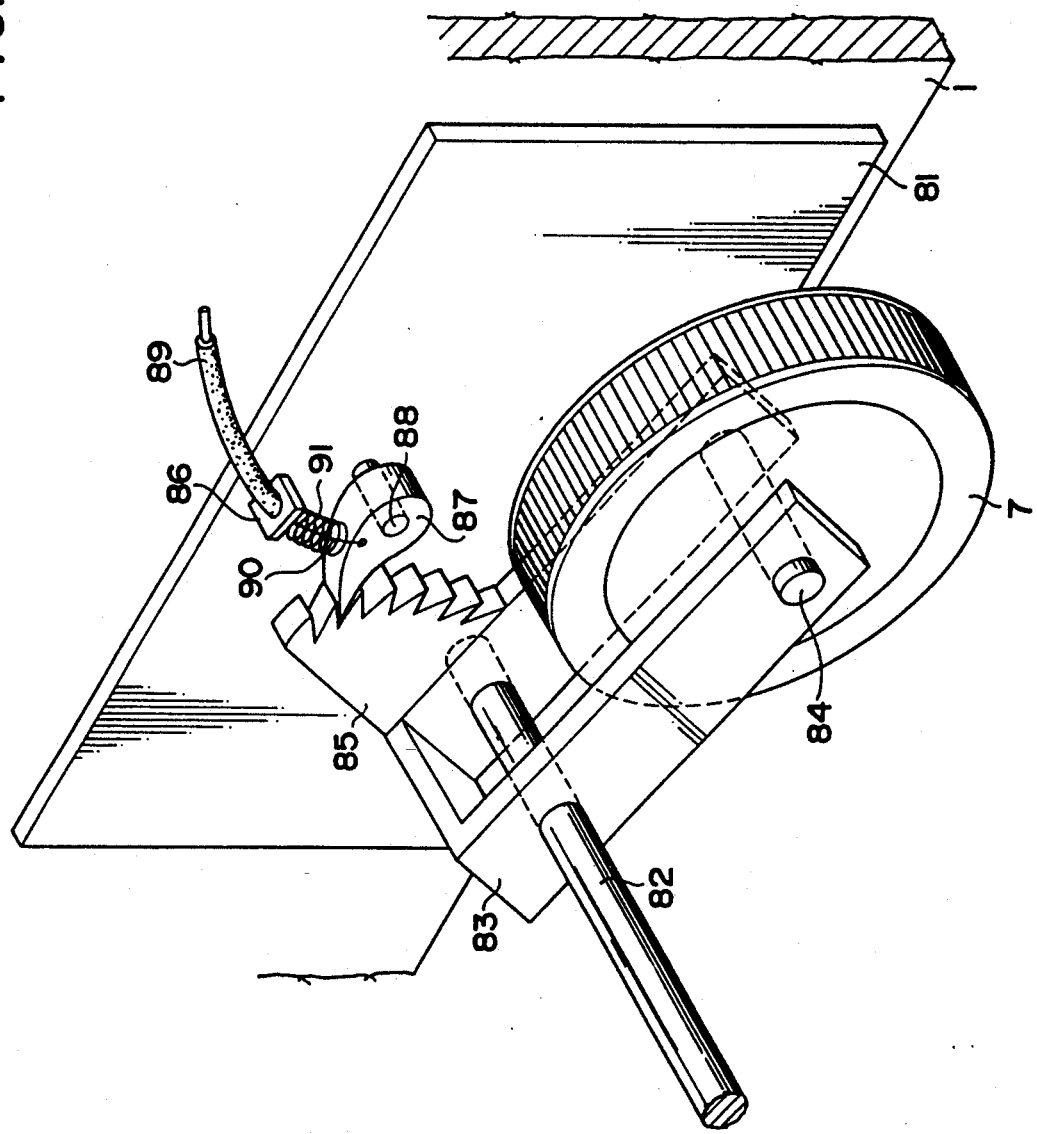
FIG. 10 is an enlarged perspective view showing a part of a moving mechanism according to a fifth embodiment of the present invention.
Figure 11:
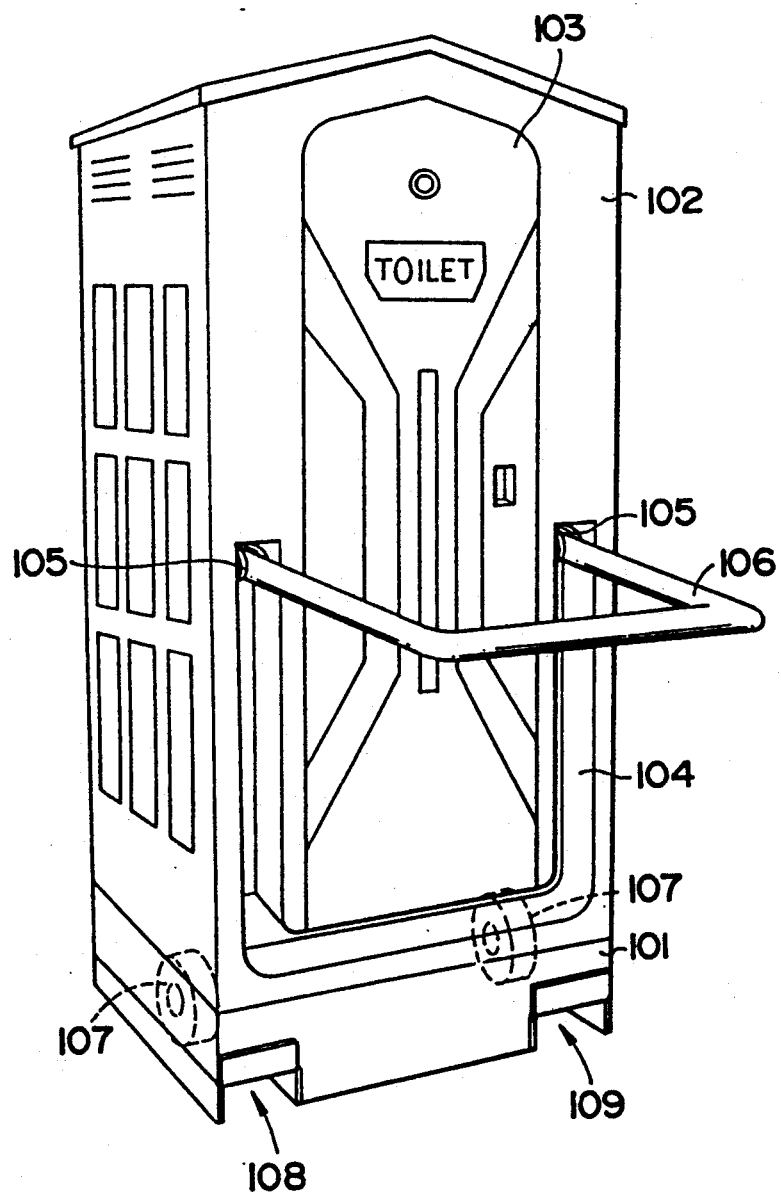
FIG. 11 is a perspective view showing a moving mechanism for a portable toilet, as an example of a heavy object, according to a sixth embodiment of the present invention.

Fifth Embodiment (FIG. 10)

A mechanism for moving a heavy object according to a fifth embodiment of the present invention will be described with reference to FIG. 10.

A shaft-supporting plate 81 is fixed to the inner wall of the base 1. A supporting shaft 82 extends between shaft-supporting plates 81 on opposite sides of the base. Only one of the wheels 7 and supporting plates 81 is shown in FIG. 10. The other wheel and supporting plate have the same construction. A substantially U-shaped swing body 83 is swingably mounted on the supporting shaft 82. The wheel 7 is inserted between the legs of the swing body 83 and is rotatably supported by a wheel shaft 84 which is mounted on the swing body 83. A fan-shaped or arcuate ratchet 85 is fixed to a side surface of the swing body 83 at the rearward portion thereof and close to the shaft-supporting plate 81. The shaft-supporting plate 81 has a shaft 88 on which a ratchet pawl 87 is mounted for pivotal movement. The ratchet pawl 87 meshes with teeth provided on the outer circumference of the ratchet 85. The shaft-supporting plate 81 has a cable housing receiver 86 mounted on the inner wall thereof. The receiver 86 is connected to the tip end of a wire cable housing 89 and a wire 90 that extends from the wire cable housing 89 is connected to a central portion of the ratchet pawl 87. A coil spring 90 is interposed between the ratchet pawl 87 and the cable housing receiver 86 so that the ratchet pawl 87 is biased counterclockwise in FIG. 10 by the coil spring 91.

The inclination position of the swing body 83 is fixed when the ratchet pawl 87 meshes with the teeth of the ratchet 85, according to the fifth embodiment. When the wheel 7 is to be vertically moved relative to the base 1, the wire 90 is pulled and the ratchet pawl 87 is turned clockwise against the resiliency of the coil spring 91 so that the ratchet 85 is disengaged from the ratchet pawl 87. Consequently, the ratchet 85 and the swing body 83 can pivot freely about the supporting shaft 82 so that the wheel 7 can move vertically relative to the base 1. The wheel 7 is either entirely received inside the base 1 or projects below the lower surface of the base 1 When the wheel 7 is to be fixed against pivotal movement, the wire 90 is slackened, so that the coil spring 91 is extended and the ratchet pawl 87 meshes with the teeth of the ratchet 85.

With the arrangement of the moving mechanism according to the first to fifth embodiments, it is possible to move the heavy object for a short distance by manpower without using a crane or a forklift truck because the wheel can project below the lower edge of the base 1. Accordingly, it is possible to move the object with ease without requiring a large-scale carrying mechanism.

Sixth Embodiment (FIGS. 11 to 16)

A mechanism for moving a heavy object according to a fifth embodiment of the present invention will be described with reference to FIGS. 11 to 16.

Figure 14:
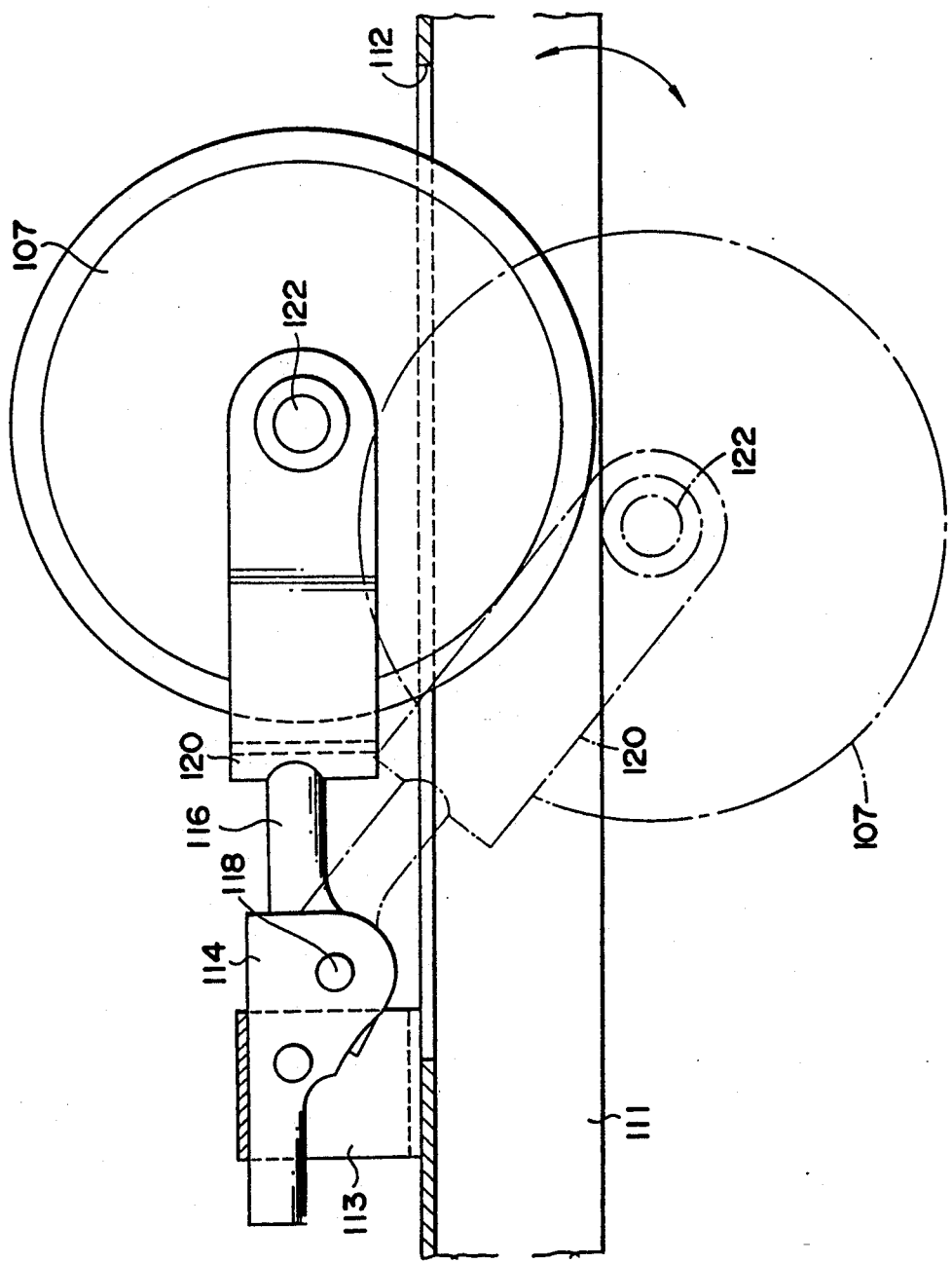
FIG. 14 is a side elevational view in FIG. 13.

A frame plate 111 which is substantially U-shaped in cross-section is incorporated into the lower portion of the base 101 at both the right and left sides of said base. Downwardly opening channels 108 and 109 are provided by the plates 111. A rectangular window or opening 112 is provided through the central upper surface of the frame plate 111. A substantially U-shaped channel body 113 is fixed to the plate portion adjacent to one end of the window 112. Two parallel pawl shafts 114 and 115, respectively, are fixed into the inside of the channel body 113. Ratchet shafts 116 and 117 are connected to the tip ends of the pawl shafts 114 and 115, respectively, and are positioned over the window 112. The pawl shaft 114 and the ratchet shaft 116 are connected to each other by a swing shaft 118, while the pawl shaft 115 and the ratchet shaft 117 are connected with each other by a swing shaft 119. A shaft-supporting plate 120 is connected to the tip end of the ratchet shaft 116 while a shaft-supporting plate 121 is connected to the tip end of the ratchet shaft 117. The shaft-supporting plates 120 and 121 are parallel with each other and a wheel 107 is inserted therebetween. The wheel 107 is rotatably supported by a supporting shaft 122 which penetrates the tip ends of both of the shaft-supporting plates 120 and 121. The wheel 107 is positioned in association with the opening of the window 112 by the shaft-supporting plates 120 and 121. FIG. 14 is a side elevation view showing the state where the wheel 107 is held by the shaft-supporting plates 120 and 121.

Figure 15:
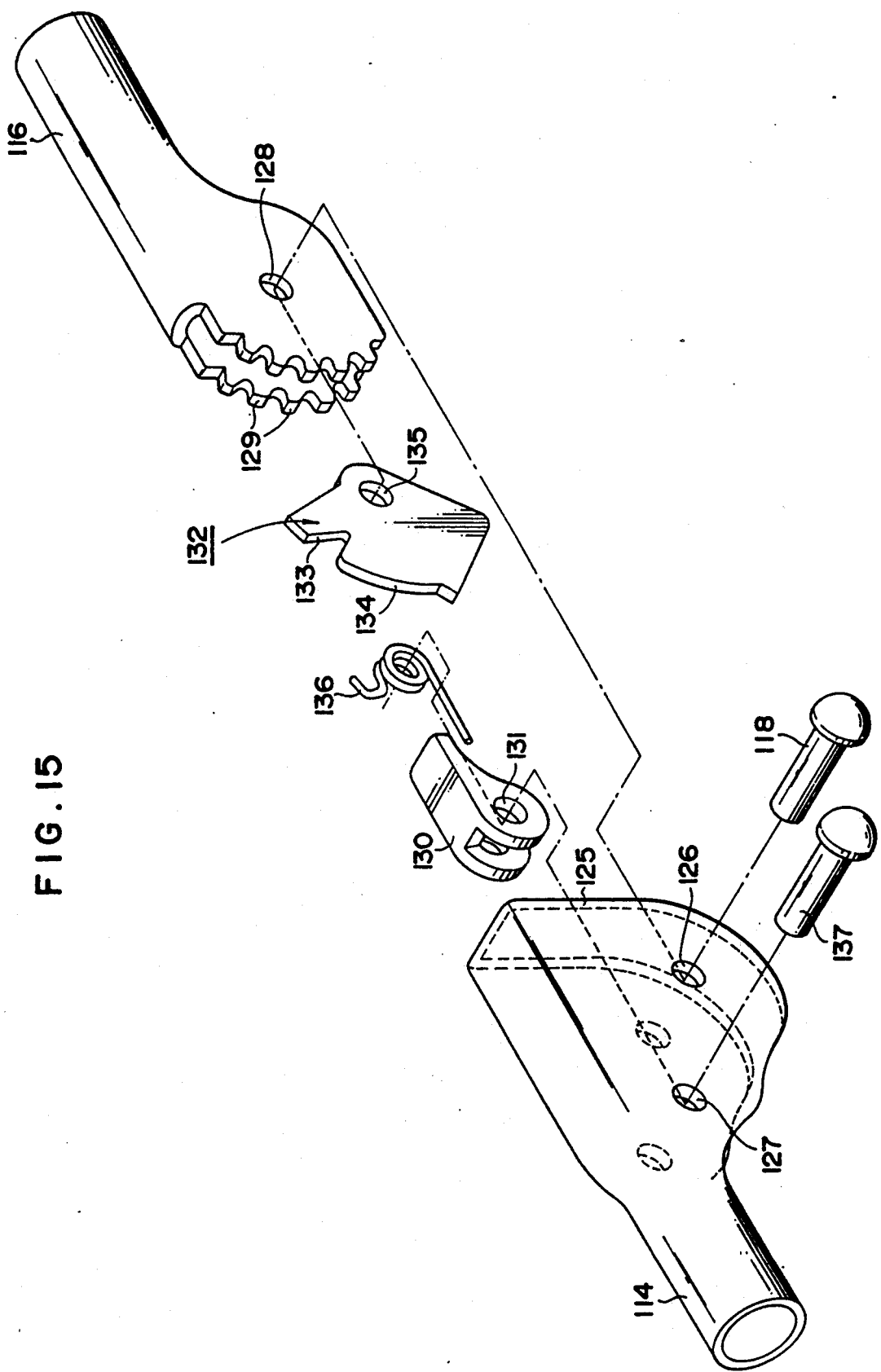
FIG. 15 is an exploded perspective view showing the fixing mechanism of the moving mechanism in FIG. 11.

FIG. 15 is a view showing the mechanism for connecting the pawl shaft 114 and the ratchet shaft 116. The mechanism for shafts 115 and 117 is the same.

The pawl shaft 114 and the ratchet shaft 116 are respectively formed by bending steel plates. The shaft 114 has side plates 125 disposed in parallel with each other. The side plates 125 have aligned pin holes 126 at the central portion thereof and aligned pin holes 127 at the portion thereof adjacent to the outer base portions thereof. The ratchet shaft 116 also has two parallel plate portions 225 at the tip end thereof. The spacing between the two parallel plate portions 225 is less than the spacing between the side plates 125 so that two parallel plate portions 225 can be received between the side plates 125. Aligned shaft holes 128 are provided through the two parallel plate portions 225. Arcuate ratchets 129 are formed around the outer circumferences of the two parallel plate portions 225 at the front portion of the shaft 116. A pawl body 130 has a width less than the internal spacing between the side plates 125. The pawl 130 has pawl holes 131 at the rear portion thereof. A releasing plate 132, to be contained between the two parallel plate portions 225, is formed by punching a thin steel sheet and it has a recess 133 in the outer periphery thereof and a surface 134 extending from the recess 133. The sliding surface 134 is circular arc shaped about a loose hole 135 provided in the releasing plate 132.

The assembly of the pawl shaft 114 and the ratchet shaft 116 will be described hereinafter.

A pawl pin 137 is inserted into the pin hole 127 and also inserted into the pawl holes 131 and the other pin hole 127. A coil spring 136 is disposed between the pawl holes 131 and the pawl pin 137 passes through it. Consequently, the pawl body 130 and the coil spring 136 are co-axially supported by the pawl pin 137 whereby the pawl body 130 is always biased clockwise by the coil spring 136, as appearing in FIG. 15. Subsequently, the pivot shaft 118 is inserted into the pin hole 126, into the shaft hole 128, into the loose hole 135, into the other shaft hole 128 and finally through the other pin hole 126. Accordingly, the ratchet shaft 116 and the releasing plate 132 are co-axially rotatably supported by the pivot shaft 118 while the releasing plate 132 is loosely received on shaft 118 because the loose hole 135 has a slightly larger diameter than shaft 118.

The operation of fixing mechanism 123 will be described in more detail with reference to FIGS. 16(A), 16(B), 16(C) and 16(D), which illustrate the mutual relationship between the pawl shaft 114 and the ratchet shaft 116.

Figure 16A:
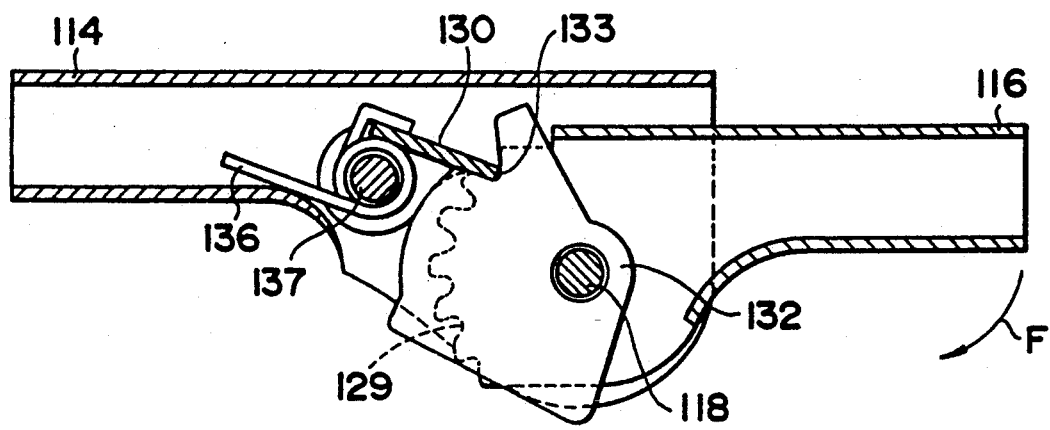
FIGS. 16(A), 16(B), 16(C) and 16(D) are views showing the operation of the fixing mechanism in FIG. 15.
Figure 16B:
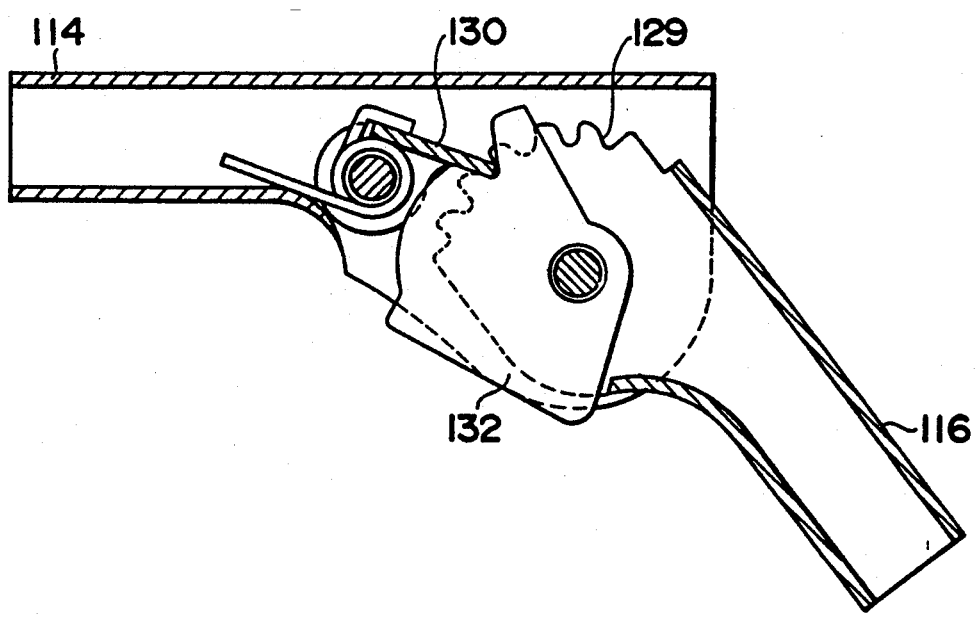

FIG. 16(A) shows a state wherein the pawl shaft 114 and the ratchet shaft 116 are arranged in a straight line or linear arrangement. In this state, the pawl body 130 meshes with a tooth of the ratchet 129 and also is received in the recess 133. If the ratchet shaft 116 is turned in the direction of the arrow F in FIG. 16(A), the ratchet shaft 116 is turned relative to the pawl shaft 114 about the swing shaft 118 so that the pawl body 130 is pushed up and turned as illustrated in FIG. 16(B). In this state, with the pawl body 130 still received in the recess 133 of the releasing plate 132, the releasing plate 132 is not turned, but rather, is retained in the same position. Thereafter, if the ratchet shaft 116 is turned as illustrated in FIG. 16(B), the pawl body 130 meshes with the ratchet 129 so that the angular interval between the pawl shaft 114 and the ratchet shaft 116 cannot be changed, that is, the ratchet shaft 116 is not returned to its original position even if the ratchet shaft 116 is pushed upward opposite to the direction of the arrow F since the ratchet shaft 116 meshes with the pawl body 130. The wheel 107 is kept retained as it appears under the base 101 as illustrated in FIGS. 12(B), 12(C) and 12(D).

FIG. 16(B) shows the state in which the heavy object is moved, namely, the state where the wheel 107 extends below the lower surface of the base 101.

Figure 16C:
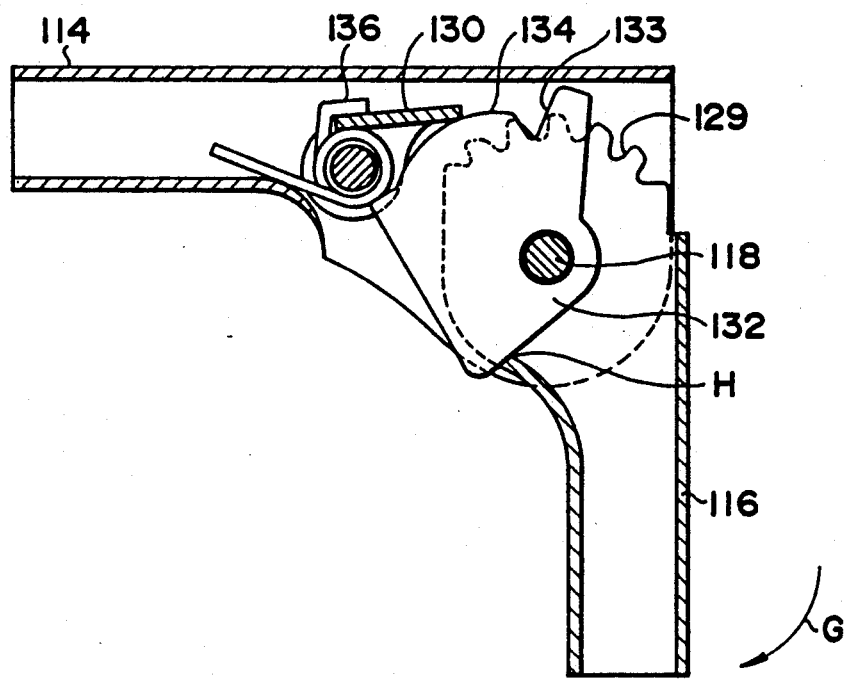
Figure 16D:
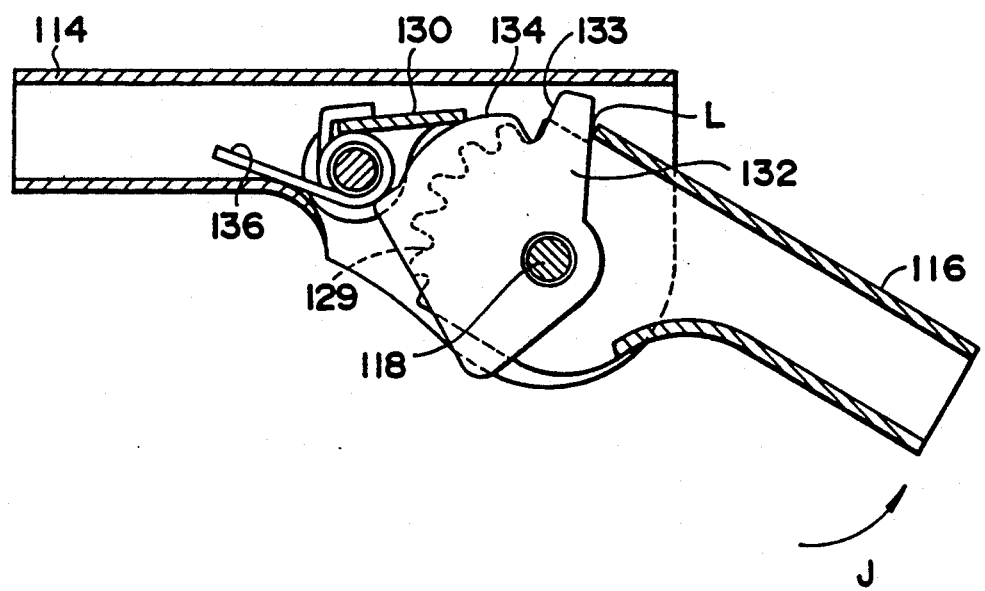

FIGS. 16(C) and 16(D) show the state where the wheel 107 is returned inside the base 101.

If the ratchet shaft 116 is turned from the state wherein the pawl body 130 restricts the rotation of the ratchet shaft 116 as illustrated in FIG. 16(B) to the state where the ratchet shaft 116 is turned in the direction of the arrow G as illustrated in FIG. 16(C), a projection H of the ratchet shaft 116 pushes on the rear portion of the releasing plate 132 so that the releasing plate 132 is first turned clockwise about the swing shaft 118. Thereafter, the pawl body 130 that was previously meshing with the recess 133 is pushed up against the resiliency of the spring 136 and slidably engages the outer circumference of the sliding surface 134. As a result, the pawl body 130 contacts the sliding surface 134 so that the pawl body 130 is disengaged from the ratchet 129 to release the restriction on the turning of the ratchet 129 to the opposite direction of the pawl body 130. Accordingly, the ratchet shaft 116 can freely turn counterclockwise relative to the pawl shaft 114 so that the ratchet shaft 116 can be returned in the direction of the arrow J as illustrated in FIG. 16(D).

A tip end L of the ratchet shaft 116 contacts a rear portion of the releasing plate 132 just before the ratchet shaft 116 returns to the position as illustrated in FIG. 16(A) turning in the opposite direction relative to the swing shaft 118 so that the releasing plate 132 is turned counterclockwise about the swing shaft 118. Consequently, the tip end of the pawl body 130 on the sliding surface 134 again meshes with the recess 133 while the pawl body 130 meshes with the tooth of the ratchet 129 so that the ratchet shaft 116 returns to the state as illustrated in FIG. 16(A).

With the repetition of the motions as illustrated in FIGS. 16(A) to 16(B), the lowered position of the wheel 107 is varied, at the same time that the angle of inclination of the ratchet shaft 116 relative to the pawl shaft 114 is varied, respectively, depending on the angle of inclination of the portable toilet 102 relative to the earth. The ratchet shaft 116 is fixed to or released from a specific position depending on these inclination angles. As a result, the wheel 107 can be freely pushed in or pulled out depending on the inclination angle of the toilet 102 relative to the earth or fixed in a specific position during the motions thereof.

Figure 17:
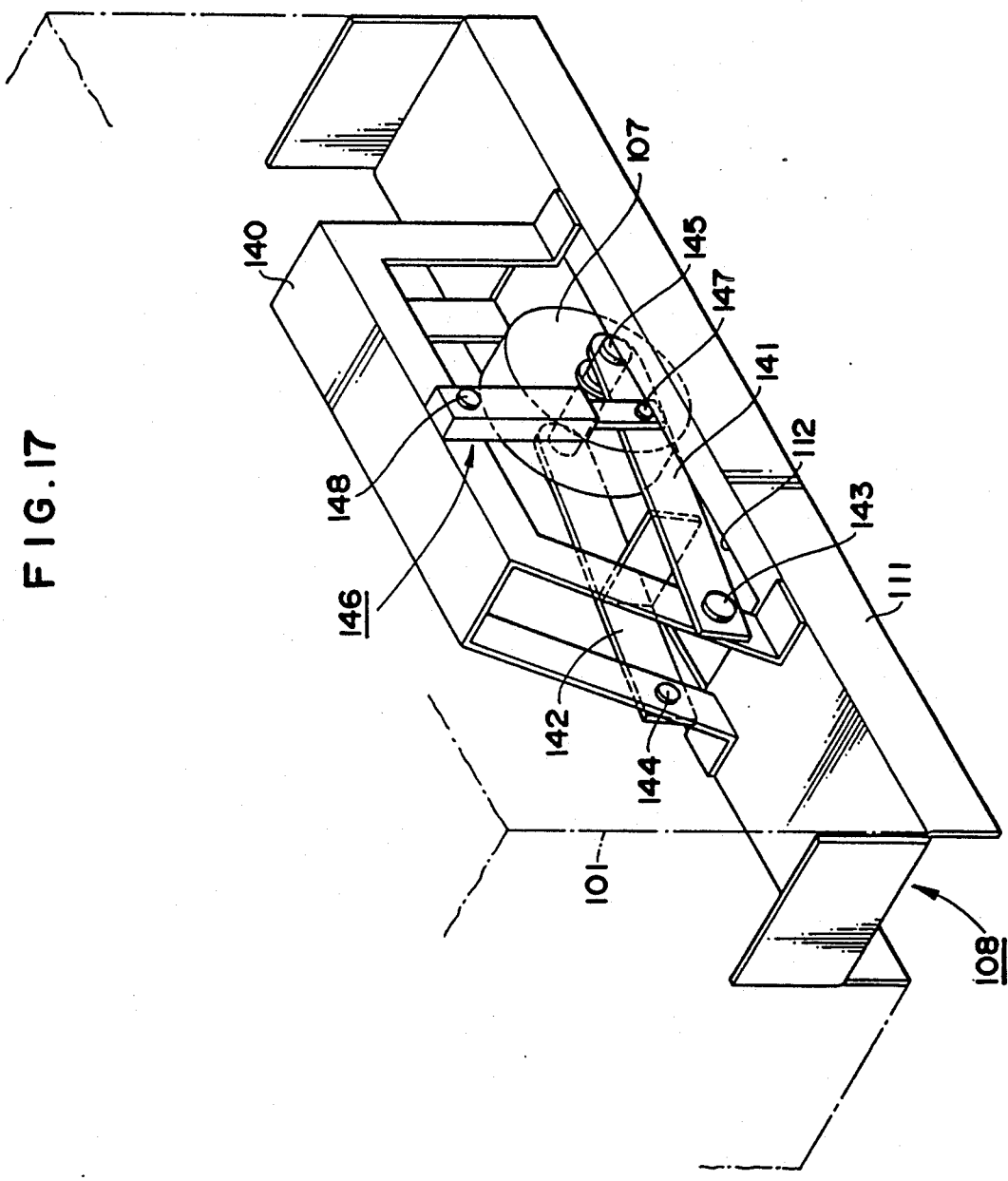
FIG. 17 is a perspective view showing a holding mechanism of a wheel of a moving mechanism according to a seventh embodiment of the present invention.
Figure 18:
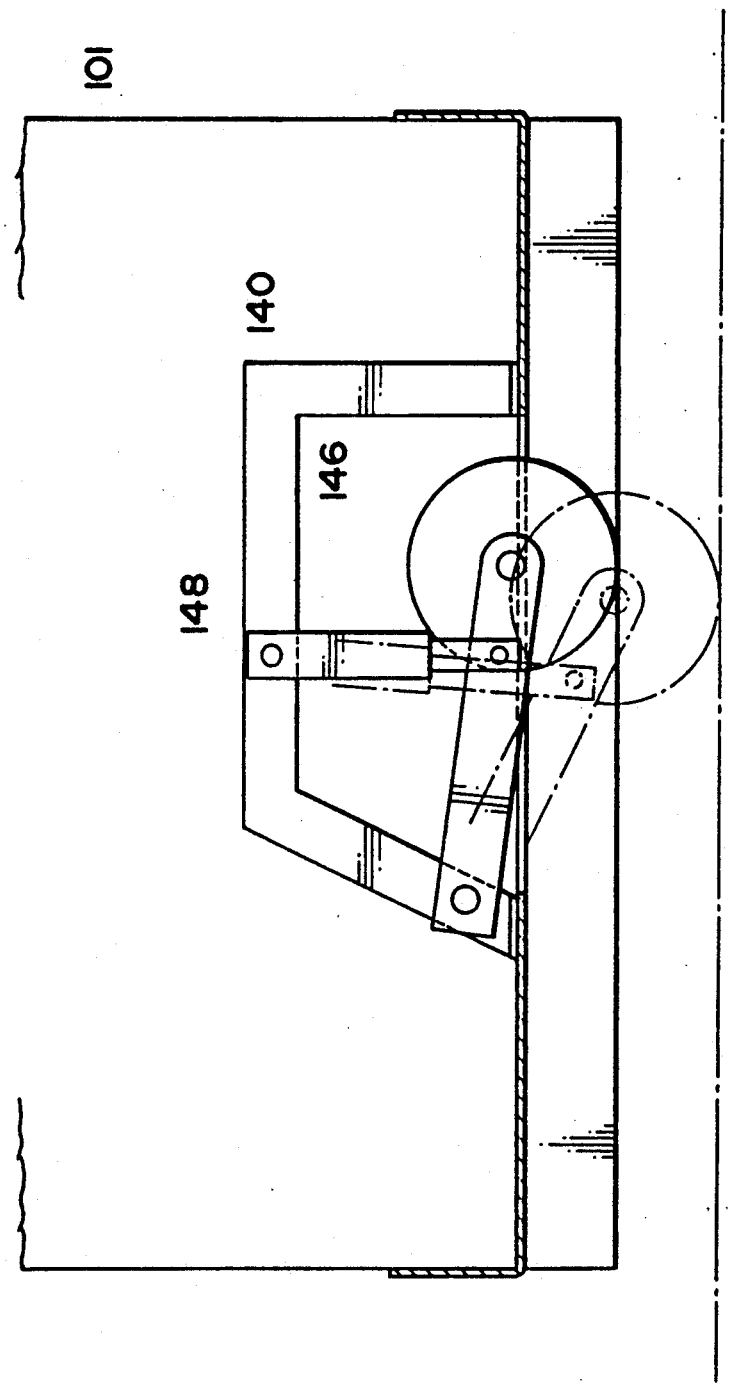
FIG. 18 is a side elevational view in FIG. 17.
Figure 19:
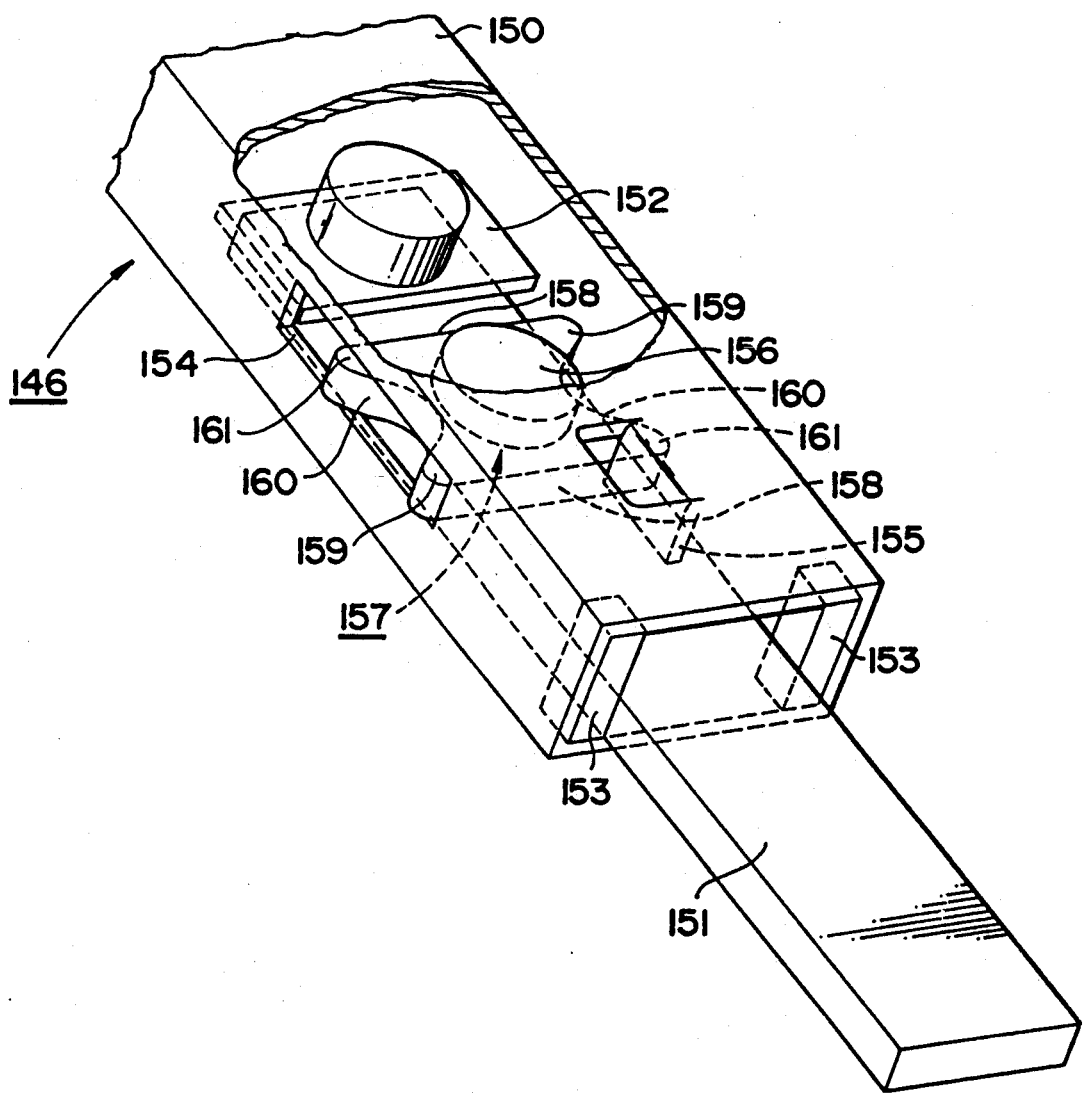
FIG. 19 is a perspective view, cut away in part, of a fixing mechanism of the moving mechanism in FIG. 17.

Seventh Embodiment (FIGS. 17 to 20):

A mechanism for moving a heavy object, according to a seventh embodiment of the present invention, will be described with reference to FIGS. 17 to 20 in which FIG. 17 is a perspective view showing the moving mechanism of the seventh embodiment, FIG. 18 is a side elevational view of the moving mechanism in FIG. 17 and FIG. 19 is a perspective view of a fixing mechanism employed in the moving mechanism of FIG. 17.

A frame 140 is fixed so as to extend forwardly of and rearwardly of the window 112 in the upper surface of the frame plate 111. The frame 140 is formed by bending a thin steel sheet and it has an upper portion positioned higher than the upper portion of the frame plate 111. Shaft-supporting plates 141 and 142 are positioned at the lower sides of the frame 140 and on opposite sides thereof. The plates 141 and 142 are rotatably connected with the frame 140 by shafts 143 and 144 at the rear ends thereof. The wheel 107 is inserted between the forward or tip ends of the shaft-supporting plates 141 and 142 and is rotatably supported on said plates by a supporting shaft 145. Accordingly, the wheel 107 is supported by the supporting plates 141 and 142 and is vertically movable through the opening of the window 112. A fixing mechanism 146 is connected with the shaft-supporting plate 141 and the upper portion of the frame 140 by pins 147 and 148.

The internal arrangement of the fixing mechanism 146 will be described with reference to FIG. 19.

The fixing mechanism 146 comprises an outer cylinder 150 having a hollow chamber therein and a flat slider 151 is inserted into the hollow chamber of the outer cylinder 150 so that the slider can slide lengthwise in the cylinder 150. The outer cylinder 150 is formed by bending a steel plate and it is rectangular in cross-section at the inside thereof. The slider 151 has a width slightly less than an inner width of the outer cylinder 150. A guide plate 152 is fixed at the rear end of the slider 151 and is slidable on the inner wall of the outer cylinder 50. Block-shaped guide bodies 153 are fixed at right and left sides of the lower opening of the outer cylinder 150 so as to guide the slider 151 so that the slider 151 can move through the center of the outer cylinder 150.

The outer cylinder 150 has a control hole 154 of a slit shape through the side surface thereof and at a position close to the lower end thereof. Also the outer cylinder 150 has an internal projection 155 extending internally from and at a right angle to the top wall of the cylinder. The projection 155 is located on the inner portion at a position close to the lower end of the outer cylinder 150. A rotatable body 157 is rotatably supported by a supporting shaft 156 on the upper surface of the slider 151 and said body has a center of rotation slightly offset from the central axis of the slider 151 in a direction toward the control hole 154. The rotary body 157 has linear portions 158, stopping projections 159, rotary recesses 160 and restricting projections 161. The linear portions 158 are parallel with each other and the other portions are disposed to be symmetrical with each other.

The operation of the fixing mechanism 146 will be described with reference to FIGS. 20(A) to 20(E).

Figure 12A:
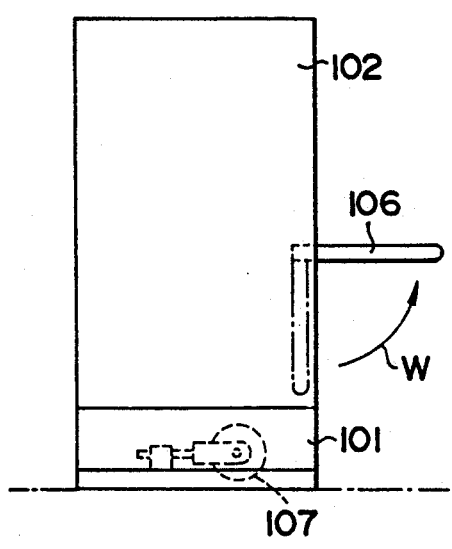
FIGS. 12(A), 12(B), 12(C) and 12(D) are schematic views for explaining the operation of the moving mechanism in FIG. 11.
Figure 12B:
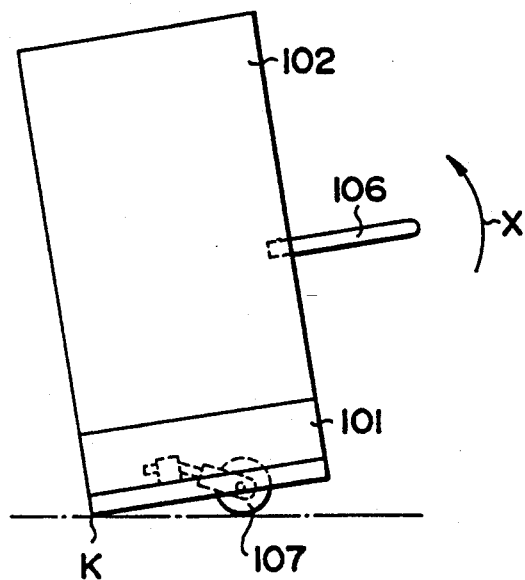
Figure 12C:
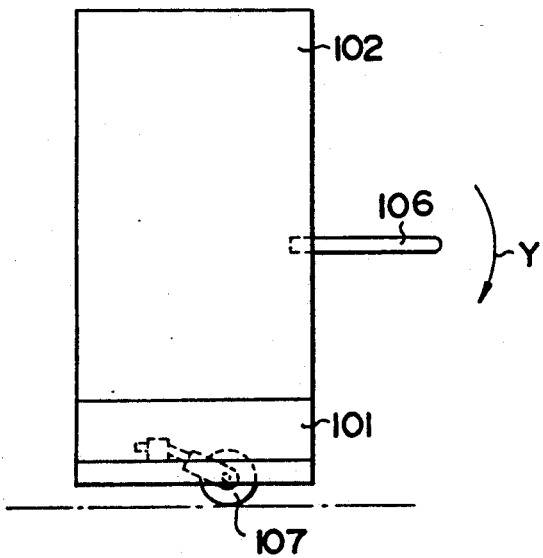
Figure 12D:
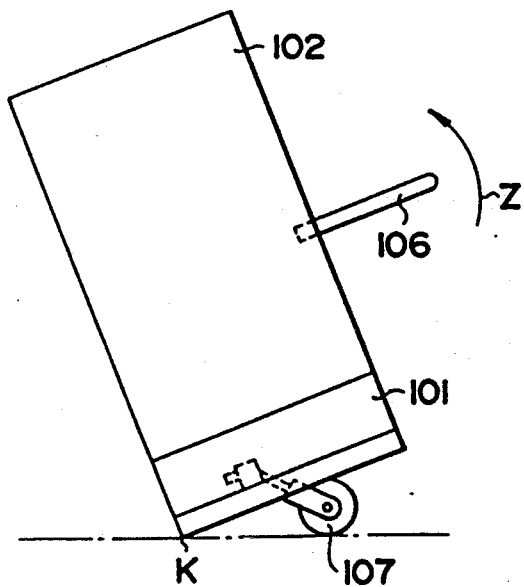
Figure 13:
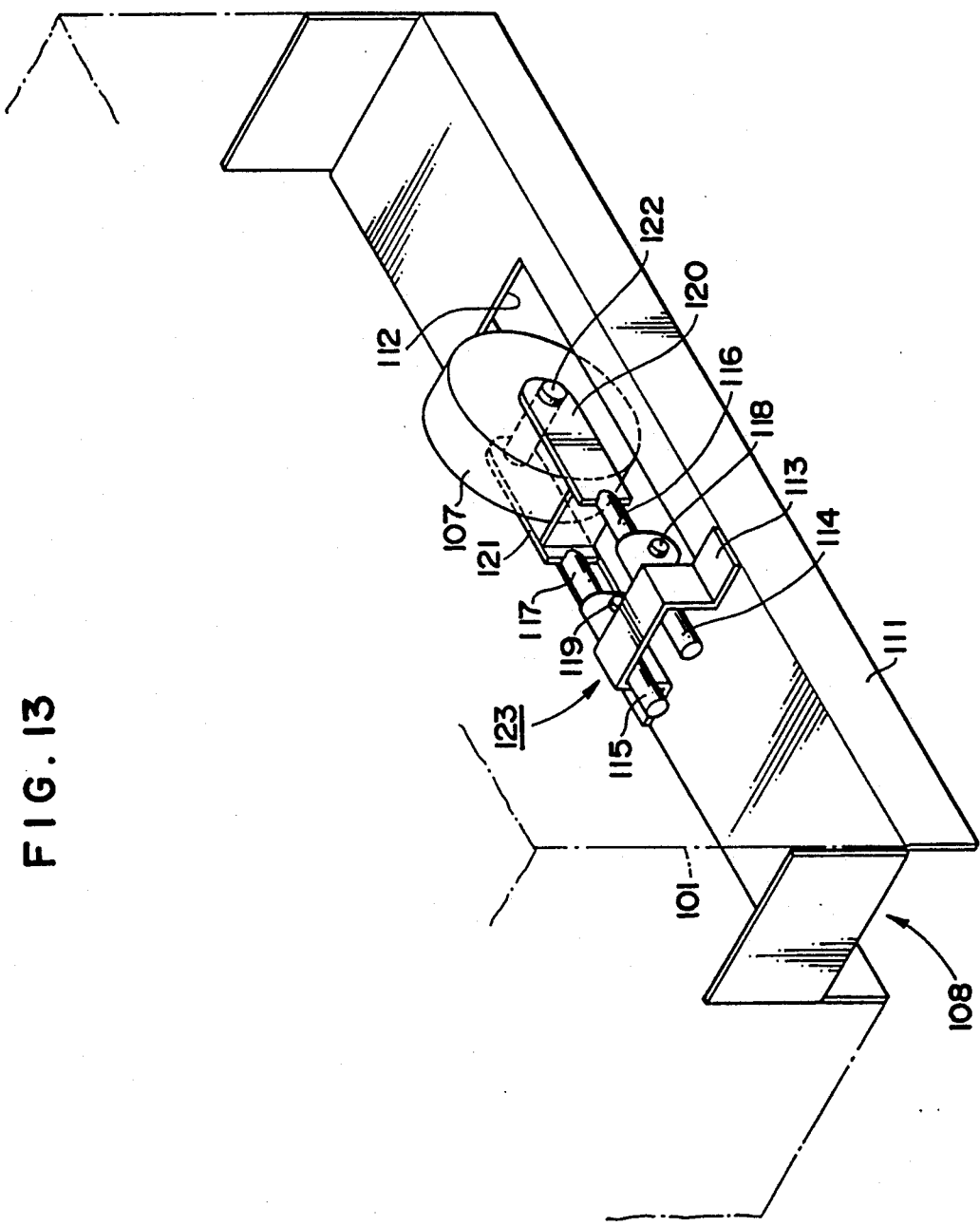
FIG. 13 is a perspective view showing a holding mechanism of a wheel of the moving mechanism in FIG. 11.
Figure 20A:
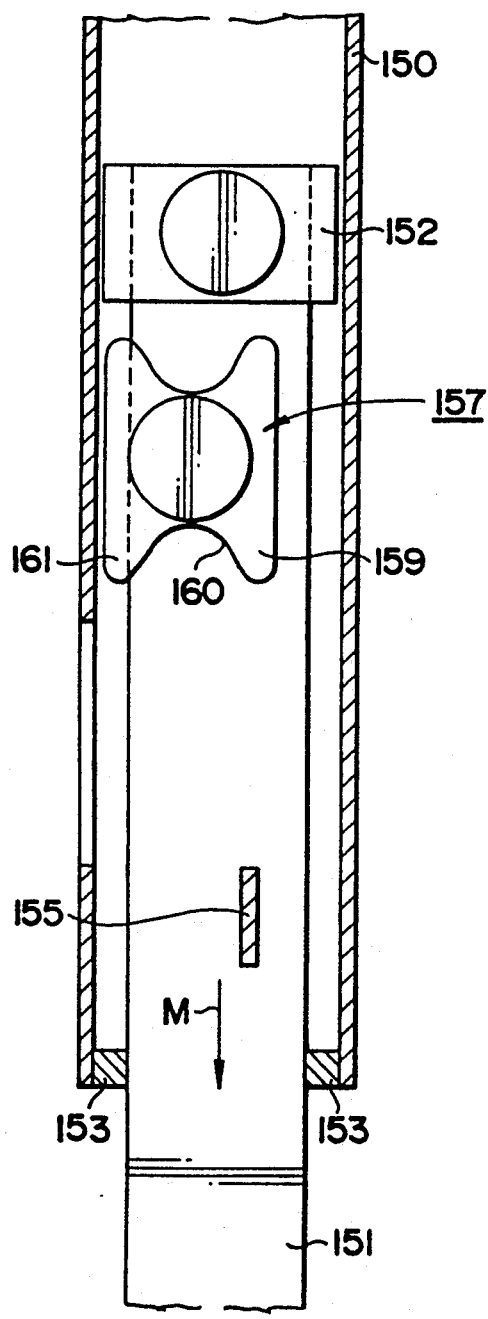
FIGS. 20(A), 20(B), 20(C), 20(D) and 20(E) are views showing the operation of the fixing mechanism in FIG. 19.

FIG. 20(A) shows a state where the slider 151 is inserted inside the outer cylinder 150 and corresponds to the state in FIG. 12(A). In this state, the slider 151 freely slides relative to the outer cylinder 150. If the slider 151 is inserted to the fullest extent into the interior of the outer cylinder 150, the entire length of the fixing mechanism 146 is reduced as much as possible, namely, the entire length becomes the shortest possible length so that the wheel 107 is housed inside the base 101.

Figure 20B:
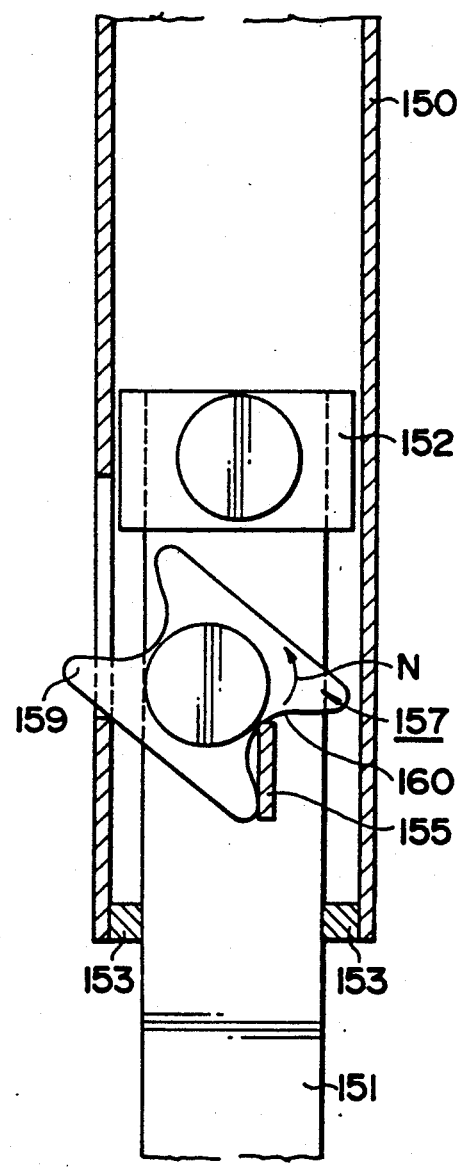

The state where the wheel 107 is lowered from the base 101 and fixed in a specific position, as illustrated in FIG. 12(B), will be described with reference to FIGS. 20(A) to 20(B).

When the slider 151 is pulled from the outer cylinder 150 in the direction of the arrow M in FIG. 20(A), the slider 151, the rotary body 157 and the guide body 152 are simultaneously moved lengthwise in the outer cylinder 150. If the end portion of the slider 151 approaches the portion adjacent to the opening of the outer cylinder 150, the inverse projection 155 contacts the outer periphery of the rotary body 157. If the end portion of the slider 151 further approaches the opening of the outer cylinder 150, the inverse projection 155 contacts the rotary recess 160 of the rotary body 157, whereby the rotary body 157 is turned in the direction of the arrow N as illustrated in FIG. 20(B). Consequently, the stopping projection 159 projects from the control window 154.

Figure 20C:
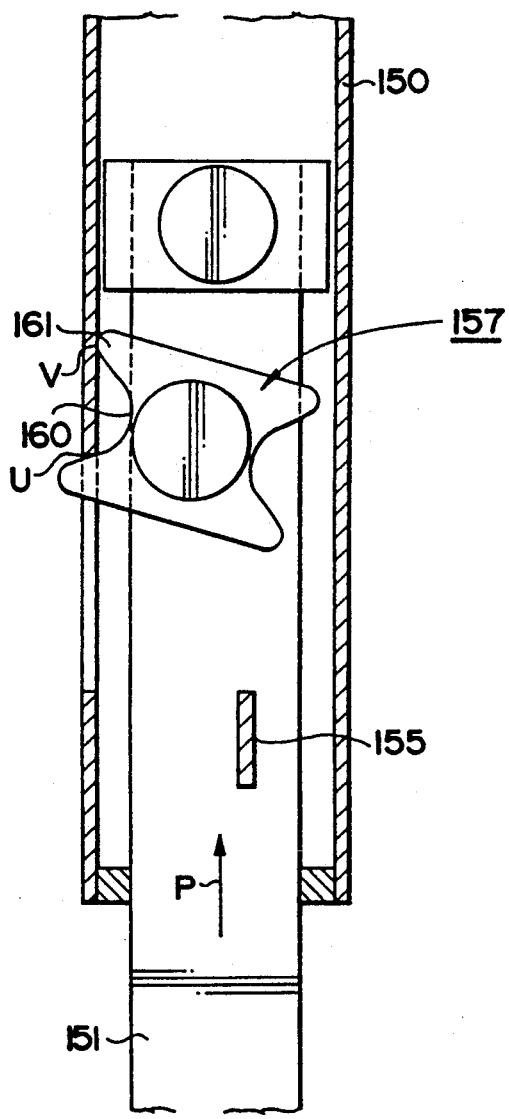

Whereupon, when the slider 151 is moved in the direction of the arrow P in FIG. 20(C), contrary to the operation as illustrated in FIG. 20(A), so that the slider 151 is pushed upwardly inside the outer cylinder 150, the rotary body 157 moves while it is in an inclined position. During this motion of the rotary body 157, the rotary recess 160 contacts the inner edge U of the control window 154 while the restricting projection 161 contacts the inner wall V of the outer cylinder 150. Accordingly, the position of the rotary body 157 is specified by a triangular shape formed by the positions of the inner edge U and the inner wall V which the rotary body 157 contacts and the center of the supporting shaft 156. As a result, even if the force to push the slider 151 into the direction of the arrow P is applied to the slider 151, the slider 151 is fixedly positioned in the position as illustrated in FIG. 20(C) without collapsing the triangular shape. FIG. 20(C) shows the state where the wheel 107 is disposed below the base 101 and is fixedly positioned.

Described hereinafter is the case wherein the slider 151 is pushed downwardly inside the outer cylinder 150 from the state where the slider 151 is fixedly positioned in the outer cylinder 150 in FIG. 20(C).

Figure 20D:
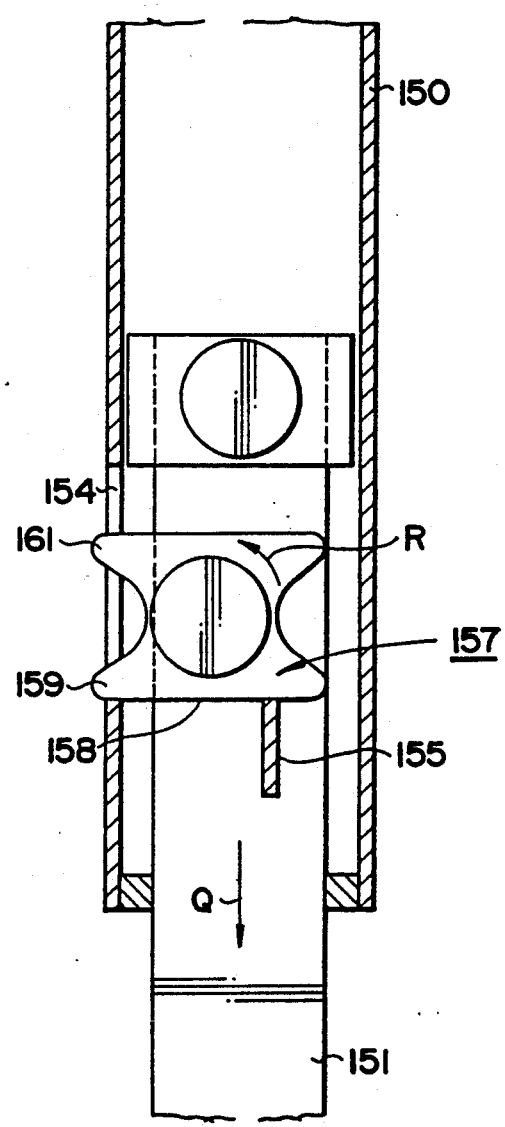
Figure 20E:
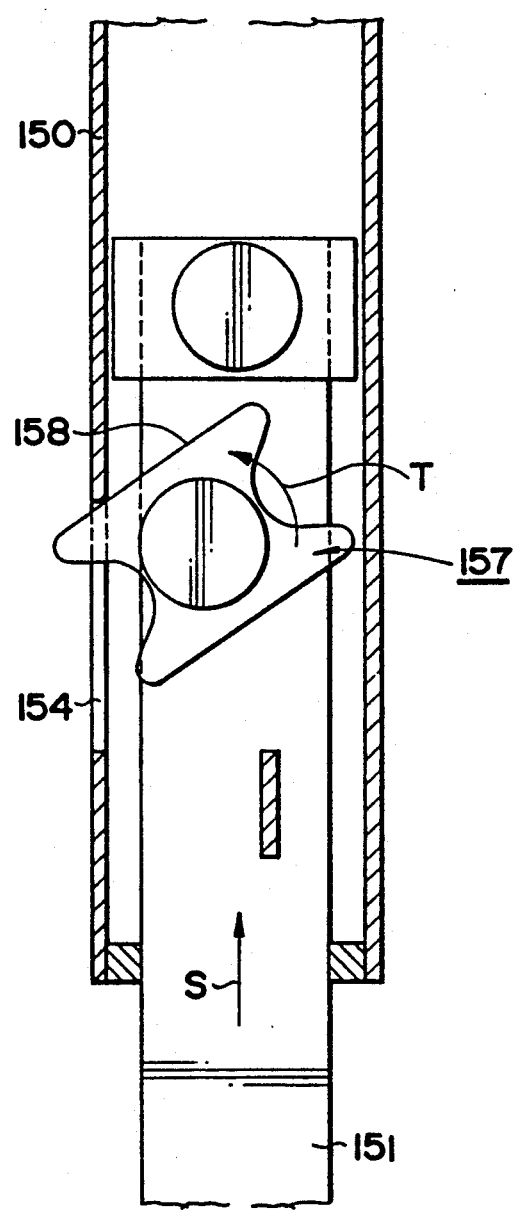

The slider 151 is first pulled in the direction of the arrow Q as illustrated in FIG. 20(D) so that the rotary body 157 is moved downward while it is inclined as illustrated in FIG. 20(C). However, the linear portion 158 contacts the internal projection 155 and is turned counterclockwise by the internal projection 155 and the control window 154 in the direction of the arrow R in FIG. 20(D). At this state, the stopping projection 159 and restricting projection 161 of the rotary body 157 both project sideways from the opening of the control window 154. Subsequently, the slider 151 is moved in the direction of the arrow S as illustrated in FIG. 20(E) so that the slider 151 is operated to be pushed inside the outer cylinder 150 from the state where the slider 151 cannot be pulled further in the direction of the arrow Q as illustrated in FIG. 20(D). The rotary body 157 is moved inside the outer cylinder 150 together with the slider 151 and a the same time the upper linear portion 158 contacts the inner edge of the control window 154 and is turned counterclockwise in the direction of the arrow T in FIG. 20(E). Inasmuch as the rotary body 157 has nothing to contact that would prevent further rotation, the linear portion 158 of the rotary 157 is turned in parallel with the inner wall of the outer cylinder 150 by the cooperation of the linear portion 158 and the control window 154 and the rotary body is returned to the position where the linear portion 158 does not contact the inner wall of the outer cylinder 150 as illustrated in FIG. 20(A). If the slider 151 is further moved in the direction of the arrow S, the slider 151 can be moved to its innermost possible position in the outer cylinder 150.

As mentioned above, as the slider 151 is pulled and positioned at the predetermined positions in the order as illustrated in FIGS. 20(A), (B), (C), (D) and (E), the slider 151 is kept in the cylinder 150 as it is pulled lengthwise therein. If the slider 151 is again pulled, the positional fixing state of the slider 151 is released so that the slider 151 is pushed inside the outer cylinder 150. With the repetition of the operations in sequence, it is possible to expose the wheel 157 under the lower surface of the base 101 or house the wheel 107 inside the base 101 as illustrated in FIGS. 21(A), (B) and (C) only by the simple operation to incline the portable toilet (102).

With the arrangement of the mechanism according to the seventh embodiment, the wheel can be fixedly exposed or appear under the base and also can be housed inside the base by a simple inclination of the object, which results in achieving very simplified structure capable of eliminating the remote control mechanism such as a wire and a cable.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mechanism for moving a heavy object, comprising:
a base having a heavy object supported thereon, wheel means supported on said base for movement between an upper position in which said wheel means is supported above the lower surface of said base and a lower position in which at least a portion of the periphery of said wheel means extends below the lower surface of said base so that said base and said object are supported for rolling motion along the ground, releasable means for maintaining said wheel means in said lower position, a movable handle means attached to said heavy object for raising and lowering said base to permit said wheel means to be moved between said positions, said base being a substantially planar structure having a central internal opening which is open at its bottom, said wheel means comprising a pair of parallel, spaced-apart wheel coupled means comprising a pair of parallel, spaced-apart wheels coupled together for conjoint pivotal movement between said positions, said pair of wheels being mounted on a carriage which is pivotally mounted on said base, said carriage having two vertically spaced-apart pairs of openings on opposite sides thereof, said base having a pair of openings on opposite sides thereof and alternately alignable with one or the other of said two pairs of openings in said carriage in response to the position of said wheels, and said releasable means including removable lock pin means receivable through said openings in said base and the aligned openings in said carriage for releasably locking said wheels in one or the other of said positions.

2. A mechanism as claimed in claim 1 in which said carriage is comprised of a pair of parallel swing plates pivotally mounted on said base, a shaft extending between said swing plates, said wheels being mounted on said shaft.

3. A mechanism as claimed in claim 2 wherein said base includes an internal frame disposed between said swing plates and manually operable actuating means mounted on said internal frame for moving said lock pin means into and out of said openings in said base and carriage.

4. A mechanism according to claim 1, wherein said heavy object is an enclosed portable toilet.

5. A mechanism for moving a heavy object, comprising:
a base having a heavy object supported thereon, wheel means supported on said base for movement between an upper position in which said wheel means is supported above the lower surface of said base and a lower position in which at least a portion of the periphery of said wheel means extends below the lower surface of said base so that said base and said object are supported for rolling motion along the ground, releasable means for maintaining said wheel means in said lower position, a movable handle means attached to said heavy object for raising and lowering said base to permit said wheel means to be moved between said positions, said base being a substantially planar structure having a central internal opening which is open at its bottom, said wheel means comprising a pair of parallel, spaced-apart wheels coupled together for conjoint pivotal movement between said positions, each of said wheels being rotatably mounted on a swing body, shaft means mounted on said base and connected to both of said swing bodies so that said swing bodies can pivot vertically simultaneously with each other, said releasable means including a pivotable locking plate engageable with one of said swing bodies for selectively locking said swing bodies in two vertically-spaced apart positions, and manually operable means for pivoting said locking plate.

6. A mechanism according to claim 5, wherein said heavy object is an enclosed portable toilet.

7. A mechanism for moving a heavy object, comprising:
a base having a heavy object supported thereon, wheel means supported on said base for movement between an upper position in which said wheel means is supported above the lower surface of said base and a lower position in which at least a portion of the periphery of said wheel means extends below the lower surface of said base so that said base and said object are supported for rolling motion along the ground, releasable means for maintaining said wheel means in said lower position, a movable handle means attached to said heavy object for raising and lowering said base to permit said wheel means to be moved between said positions, said base being a substantially planar structure having a central internal opening which is open at its bottom, said wheel means comprising a pair of parallel, spaced-apart wheel coupled together for conjoint pivotal movement between said position, each of said wheels being rotatably mounted on a swing body, shaft means mounted on said base and connected to both of said swing bodies so that said swing bodies can pivot vertically simultaneously with each other, said releasable means including a fluid-pressure operated cylinder connected between said base and one of said swing bodies for selectively locking said swing bodies in two vertically spaced-apart position, a valve for operating said cylinder, and manually operable means for operating said valve.

8. A mechanism according to claim 7, wherein said heavy object is an enclosed portable toilet.

9. A mechanism for moving a heavy object, comprising:
a base having a heavy object supported thereon, wheel means supported on said base for movement between an upper position in which said wheel means is supported above the lower surface of said base and a lower position in which at least a portion of the periphery of said wheel means extends below the lower surface of said base so that said base and said object are supported for rolling motion along the ground, releasable means for maintaining said wheel means in said lower position, a movable handle means attached to said heavy object for raising and lowering said base to permit said wheel means to be moved between said positions, said base being a substantially planar structure having a central internal opening which is open at its bottom, said wheel means comprising a pair of parallel, spaced-apart wheel coupled together for conjoint pivotal movement between said positions, each of said wheels being rotatably mounted on a swing body, shaft means mounted on said base and connected to both of said swing bodies so that said swing bodies can pivot vertically simultaneously with each other, said releasable means including a ratchet and pawl mechanism connected between said base and one of said swing bodies for selectively locking said swing bodies in two vertically spaced-apart positions, and manually operable means for operating said pawl.

10. A mechanism according to claim 9, wherein said heavy object is an enclosed portable toilet.

11. A mechanism for moving a portable toilet, comprising:
an assembly comprising a base and having an enclosed portable toilet fixedly mounted on said base, said base and said portable toilet being rectangular and of substantially the same external dimensions so that said base forms a downward extension of said toilet, said portable toilet having substantially the shape of an outhouse and having a door through a front wall thereof whereby a person can enter and leave said portable toilet, said assembly having an outwardly opening, substantially U-shaped groove in said front wall surrounding the lower portion of said door, a U-shaped handle having the upper ends of its legs disposed in and pivotally mounted at the upper ends of the legs of said groove, said handle being adapted to be pivoted between a first position in which it is substantially completely received in said groove and a second position in which it extends outwardly and substantially perpendicular to said front wall and can be grasped to raise and lower the front wall of said assembly and pivot same about a rear edge of said base, a pair of parallel, spaced-apart wheels supported inside said base adjacent to opposite sides thereof for movement, in response to gravity, between an upper position in which said wheels are above the lower surface of said base and a lower position in which at least portions of the peripheries of said wheels extend below the lower surface of said base so that said base and said portable toilet are supported for rolling motion along the ground, and releasable locking means operable when said portable toilet and said base have been pivoted upwardly about the rear edge of said base for releasably locking said wheels in said lower position.

12. A mechanism for moving a heavy object, comprising:
a base having a heavy object supported thereon, wheel means supported on said base for movement between an upper position in which said wheel means is supported above the lower surface of said base and a lower position in which at least a portion of the periphery of said wheel means extends below the lower surface of said base so that said base and said object are supported for rolling motion along the ground, a movable handle for raising and lowering said base to permit said wheel means to be moved between said positions, said handle being a substantially U-shaped handle having a pair of upright legs extending upwardly along a wall of said object and means pivotally supporting the upper ends of said legs on said object, said handle including a lower portion extending between and connecting the lower ends of said legs, said lower portion extending horizontally along said base, said base being a planar structure having a pair of parallel, spaced-apart wheels located adjacent to opposite sides thereof, said base having a pair of downwardly opening channel-shaped members located adjacent to said opposite sides thereof, said members having openings through webs thereof, said wheels being mounted on said webs and being movable upwardly and downwardly through said openings, and means for releasably locking said wheels in said positions in response to pivoting of said base about a rear edge thereof.

13. A mechanism as claimed in claim 12 in which said wall of said object and said base have wall means defining a U-shaped recess for receiving said handle.

14. A mechanism for moving a heavy object, comprising:

a base having a heavy object supported thereon, wheel means supported on said base for movement between an upper position in which said wheel means is supported above the lower surface of said base and a lower position in which at least a portion of the periphery of said wheel means extends below the lower surface of said base so that said base and said object are supported for rolling motion along the ground, a movable handle means attached to said heavy object for raising and lowering said base to permit said wheel means to be moved between said positions, said base being a planar structure having a pair of parallel, spaced-apart wheels located adjacent to opposite sides thereof, said base having a pair of downwardly opening channel-shaped members located adjacent to said opposite sides thereof, said members having openings through webs thereof, said wheels being mounted on said webs and being movable upwardly and downwardly through said openings, and means for releasably locking said wheels in said positions in response to pivoting of said base about a rear edge thereof, said releasable locking means comprising pawl shaft and ratchet shaft means connected between said channel-shaped member and its associated wheel, a ratchet on said ratchet shaft and a pawl on said pawl shaft with said ratchet and said pawl being adapted to interengage each other and a releasing plate for selectively releasing said pawl from said ratchet and reengaging same in response to the vertical movement of said ratchet shaft.

15. A mechanism for moving a heavy object, comprising:

a base having a heavy object supported thereon, wheel means supported on said base for movement between an upper position in which said wheel means is supported above the lower surface of said base and a lower position in which at least a portion of the periphery of said wheel means extends below the lower surface of said base so that said base and said object are supported for rolling motion along the ground, a movable handle means attached to said heavy object for raising and lowering said base to permit said wheel means to be moved between said positions, said base being a planar structure having a pair of parallel, spaced-apart wheels located adjacent to opposite side thereof, said base having a pair of downwardly opening channel-shaped members located adjacent to said opposite sides thereof, said members having openings through webs thereof, said wheels being mounted on said webs and being movable upwardly and downwardly through said openings, and means for releasably locking said wheels in said positions in response to pivoting of said base about a rear edge thereof, said releasable locking means comprises a fixing mechanism for each wheel, said fixing mechanism comprising a vertical cylinder and slider connected between said channel-shaped member and its associated wheel and means for selectively moving said slider with respect to said cylinder between vertically spaced-apart positions and locking means responsive to the vertical position of said slider for releasably locking said slider in said positions.

* * * * *

UNITED STATES PATENT AND TRADEMARK OFFICE
CERTIFICATE OF CORRECTION

PATENT NO. : 5,232,232
DATED : August 3, 1993
INVENTOR(S) : Mitsuhiro Kishi

It is certified that error appears in the above-identified patent and that said Letters Patent is hereby corrected as shown below:

Column 14, line 22; delete "wheel coupled means comprising".
         line 23; delete "a pair of parallel, spaced-apart".

Column 15, line 33; change "wheel" to ---wheels---.
         line 34; change "position," to ---positions,---.
         line 43; change "position," to ---positions,---.
         line 66; change "wheel" to ---wheels---.

Column 18, line 22; change "side" to ---sides---.

Signed and Sealed this

Fifteenth Day of March, 1994

Attest:

BRUCE LEHMAN

Attesting Officer     Commissioner of Patents and Trademarks